(12) United States Patent
Suzuki et al.

(10) Patent No.: US 10,815,396 B2
(45) Date of Patent: Oct. 27, 2020

(54) THERMALLY CONDUCTIVE PRESSURE-SENSITIVE ADHESIVE SHEET

(71) Applicant: NITTO DENKO CORPORATION, Ibaraki-shi, Osaka (JP)

(72) Inventors: Tatsuya Suzuki, Ibaraki (JP); Hiroki Ieda, Ibaraki (JP); Akira Hirao, Ibaraki (JP); Kenji Furuta, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 115 days.

(21) Appl. No.: 16/174,624

(22) Filed: Oct. 30, 2018

(65) Prior Publication Data

US 2019/0127611 A1    May 2, 2019

(30) Foreign Application Priority Data

Nov. 1, 2017   (JP) ................. 2017-212146

(51) Int. Cl.
*C09J 7/38* (2018.01)
*C08K 3/22* (2006.01)
(Continued)

(52) U.S. Cl.
CPC ............. *C09J 7/385* (2018.01); *C08K 3/22* (2013.01); *C09J 7/10* (2018.01); *C09J 7/38* (2018.01); *C09J 9/00* (2013.01); *C09J 11/04* (2013.01); *C09J 133/066* (2013.01); *C09J 133/26* (2013.01); *C08K 3/01* (2018.01); *C08K 2003/2227* (2013.01); *C08K 2201/001* (2013.01); *C08K 2201/003* (2013.01); *C09J 2205/102* (2013.01); *C09J 2400/10* (2013.01);
(Continued)

(58) Field of Classification Search
CPC ....... C09J 7/385; C09J 7/38; C09J 7/10; C09J 9/00; C09J 11/04; C09J 133/066; C09J 133/26; C09J 2205/102; C09J 2400/10; C09J 2433/00; C09J 2483/00; C09J 33/066; C08K 3/22; C08K 3/01; C08K 2003/2227; C08K 2201/001; C08K 2202/001; C08K 2201/003
USPC .......................................................... 524/437
See application file for complete search history.

(56) References Cited

U.S. PATENT DOCUMENTS

2015/0299531 A1   10/2015   Tojo et al.
2016/0152872 A1   6/2016   Furuta et al.
(Continued)

FOREIGN PATENT DOCUMENTS

JP       2013-213178 A    10/2013
WO   WO-2015190441 A1 * 12/2015 .............. C08L 33/06

OTHER PUBLICATIONS

Extended European Search Report dated Jan. 30, 2019, from the European Patent Office in counterpart European Application No. 18203393.6.

*Primary Examiner* — Josephine L Chang

(74) *Attorney, Agent, or Firm* — Sughrue Mion, PLLC

(57) ABSTRACT

Provided is a thermally conductive PSA sheet that comprises a PSA layer comprising a thermally conductive filler. The PSA sheet has a thermal resistance less than 6.0 $cm^2 \cdot K/W$, and also has an adhesive strength N1 at 30 minutes of standing at 23° C. after applied to a stainless steel plate and an adhesive strength N2 at 23° C. after subjected to 5 minutes of heating at 80° C. after applied to a stainless steel plate, satisfying $N2/N1 \geq 2$.

18 Claims, 2 Drawing Sheets

(51) Int. Cl.
*C09J 11/04* (2006.01)
*C09J 133/06* (2006.01)
*C09J 133/26* (2006.01)
*C09J 9/00* (2006.01)
*C09J 7/10* (2018.01)
*C08K 3/01* (2018.01)

(52) U.S. Cl.
CPC ........ *C09J 2433/00* (2013.01); *C09J 2483/00* (2013.01)

(56) References Cited

U.S. PATENT DOCUMENTS

| | | |
|---|---|---|
| 2017/0043566 A1 | 2/2017 | Kanno et al. |
| 2017/0081557 A1 | 3/2017 | Shigetomi et al. |

\* cited by examiner

[Fig. 1]
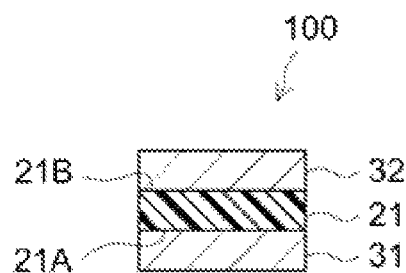
[Fig. 2]
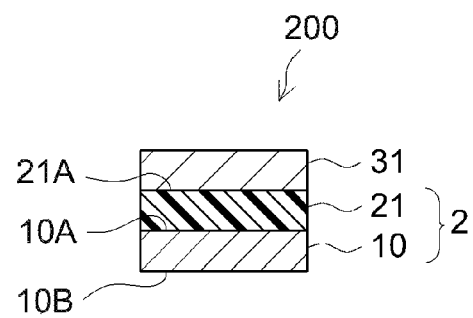
[Fig. 3]
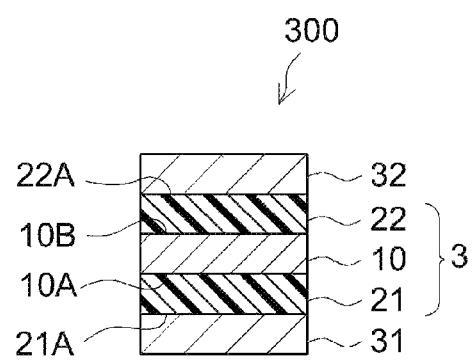

[Fig. 4(a)]
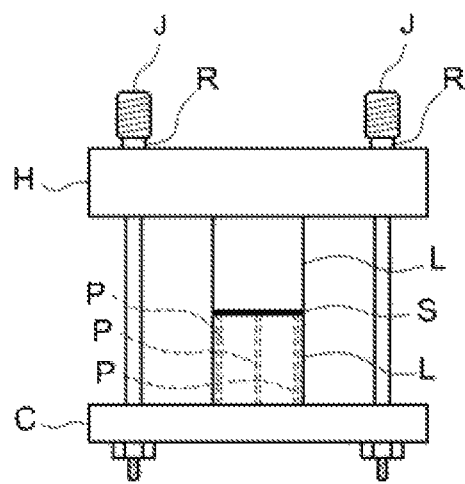
[Fig. 4(b)]
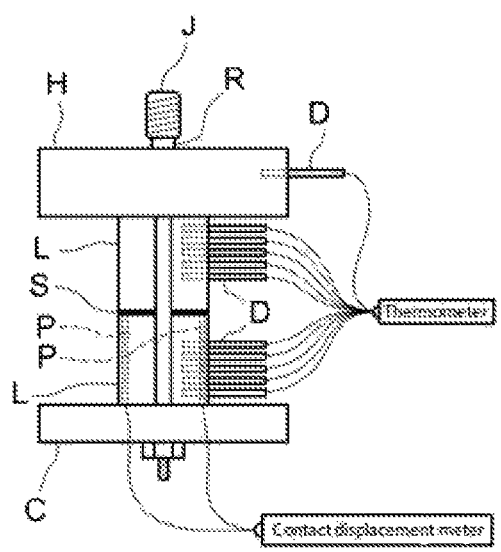

THERMALLY CONDUCTIVE PRESSURE-SENSITIVE ADHESIVE SHEET

CROSS-REFERENCE

The present invention claims priority to Japanese Patent Application No. 2017-212146 filed on Nov. 1, 2017, and the entire contents thereof are incorporated herein by reference.

BACKGROUND OF THE INVENTION

1. Field of the Invention

The present invention relates to a thermally conductive pressure-sensitive adhesive sheet.

2. Description of the Related Art

Conventionally pressure-sensitive adhesive (PSA) sheets exhibiting high adhesive strength from early on after their applications are known. When such a PSA sheet is used to fix an adherend, a PSA sheet having adhesive strength strong enough to fix the adherend is selected. As for a thermally conductive PSA sheet, high adhesive strength is also required when potential purposes include not only heat transfer, but also fixing of adherends. Background art documents about enhancing adhesion of thermally conductive PSA sheets include Japanese Patent Application Publication No. 2013-213178.

SUMMARY OF THE INVENTION

In association with the recent size reduction and densification of electronics and the like, there is also an increasing need for thermally conductive PSA sheets suited for fixing adherends. On the other hand, from the standpoint of reducing the burden for workers, shortening the time required for acquiring work skills, improving yields and so on, there is a demand for easier application of PSA sheets. However, as for a thermally conductive PSA sheet, a careful application is required because insufficient tightness of adhesion with an adherend causes a decrease in thermal conductivity between them; in fact this has prevented facilitation of the application work. For instance, if air bubbles are left at the interface with the adherend when the thermally conductive PSA sheet is applied, the air bubbles will reduce the thermal conductivity. To remove the bubbles, a rework application of the thermally conductive PSA sheet may be carried out; however, if the adhesive strength is lowered to obtain good reworkability, the adherend-fixing ability will undesirably decrease.

The present invention has been made in view of such circumstances with an objective to provide a thermally conductive PSA sheet capable of favorably combining adherend-fixing ability and reworkability.

The present description provides a thermally conductive PSA sheet that comprises a PSA layer including a thermally conductive filler. The thermally conductive PSA sheet (or simply the "PSA sheet" hereinafter) has a thermal resistance less than 6.0 cm$^2$·K/W. The PSA sheet has an adhesive strength N1 at 30 minutes of standing at 23° C. after applied to a stainless steel plate and an adhesive strength N2 at 23° C. after subjected to 5 minutes of heating at 80° C. after applied to a stainless steel plate, wherein N2 is at least two times N1. In other words, the PSA sheet satisfies N2/N1≥2. Hereinafter, the adhesive strength N1 may be referred to as "initial adhesive strength" and the adhesive strength N2, "post-heat adhesive strength"; the ratio of the post-heat adhesive strength to the initial adhesive strength, that is, N2/N1, may be referred to as an "adhesive strength rise ratio."

The thermally conductive PSA sheet has a thermal resistance less than 6.0 cm$^2$·K/W and thus can be favorably used for purposes such as heat radiation of adherends. It is constituted to have an adhesive strength rise ratio of 2 or higher, and therefore, it shows low adhesiveness suited for a rework when it is applied at around room temperature and after the adhesive strength increases, it can provide adhesive strength suited for fixing adherends and so on. In other words, adherend-fixing ability and reworkability can be favorably combined. The inventors have found that in such a PSA sheet constituted to have higher post-heat adhesive strength than initial adhesive strength, when a thermally conductive filler is included in the PSA layer, it surprisingly leads to a large increase in post-heat adhesive strength. This can enhance the adherend-fixing ability.

This description also provides a thermally conductive PSA sheet that comprises a PSA layer including a thermally conductive filler, has a thermal resistance less than 6.0 cm$^2$·K/W. The PSA sheet has an adhesive strength N1 at 30 minutes of standing at 23° C. after applied to a stainless steel plate and an adhesive strength N3 at 23° C. after subjected to 15 minutes of heating at 50° C. after applied to a stainless steel plate, wherein N3 is at least 1.5 times N1. In other words, the PSA sheet satisfies N3/N1≥1.5. Hereinafter, the adhesive strength N3 may be referred to as "post-mild-heat adhesive strength." In such a PSA sheet constituted to have higher post-mild-heat adhesive strength than initial adhesive strength, when a thermally conductive filler is included in the PSA layer, the post-mild-heat adhesive strength can be greatly increased. This can enhance the adherend-fixing ability.

In some embodiments, the thermally conductive filler content can be 80% by weight or less of the PSA layer. Such content is likely to favorably bring about both good thermal conductivity and high post-heat adhesive strength.

In some embodiments, with the PSA layer having a thickness Ta, the thermally conductive filler preferably has a mean particle diameter of 0.5 Ta or less. Such an embodiment tends to reduce deterioration of surface smoothness of the PSA layer caused by the added thermally conductive filler. Because of this, the PSA layer can be tightly adhered to the adherend for efficient heat transfer and the thermally conductive filler contained can effectively bring about high post-heat adhesive strength.

The PSA sheet according to some embodiments have a post-heat adhesive strength of 15 N/20 mm or greater. The PSA sheet exhibiting such post-heat adhesive strength has an excellent ability to fix adherends. In addition, because of the tight and strong adhesion to the adherend surface, lifting of the PSA sheet off the adherend is reduced, whereby good heat transfer can be maintained between the PSA sheet and adherend.

In the PSA sheet according to some embodiments, the PSA sheet may have a post-mild-heat adhesive strength of, for instance, 15 N/20 mm or greater. The PSA sheet exhibiting such post-mild-heat adhesive strength has an excellent ability to fix adherends. In addition, because of the tight and strong adhesion to the adherend surface, lifting of the PSA sheet off the adherend is reduced, whereby good heat transfer can be maintained between the PSA sheet and adherend.

In the PSA sheet according to some embodiments, the PSA layer has a thickness of 55 μm or greater. The thermally conductive PSA sheet having a PSA layer of 55 μm or greater in thickness is likely to tightly adhere to a rough or uneven surface. This can be advantageous from the standpoint of enhancing heat transfer between an adherend having such a surface and the PSA sheet.

In some embodiments, the PSA layer may be formed with a pressure-sensitive adhesive comprising an adhesive strength rise retarder. The adhesive strength rise retarder refers to a component that exerts a function of, when included in a PSA layer, reducing the initial adhesive strength and improving the adhesive strength rise ratio. Examples of the adhesive strength rise retarder which may be used include polymers having a monomeric unit derived from a monomer having a polyorganosiloxane skeleton, polymers having a monomeric unit derived from a monomer having a polyoxyalkylene skeleton, and the like.

In some embodiments, the PSA layer may include a siloxane structure-containing polymer Ps that comprises, as a monomeric unit, a monomer having a polyorganosiloxane skeleton. The siloxane structure-containing polymer Ps in the PSA layer may be effective in reducing the initial adhesive strength or increasing the adhesive strength rise ratio, or in both of these. This can favorably bring about a thermally conductive PSA sheet that combines reworkability and adherend-fixing ability. The siloxane structure-containing polymer Ps is preferably a copolymer of a monomer having a polyorganosiloxane skeleton and a (meth)acrylic monomer. That is, a preferable siloxane structure-containing polymer Ps has, as monomeric units, a monomer having a polyorganosiloxane skeleton and a (meth)acrylic monomer.

In some embodiments, the siloxane structure-containing polymer Ps which may preferably be used has a weight average molecular weight (Mw) of $0.7 \times 10^4$ or more but less than $5 \times 10^4$. According to the siloxane structure-containing polymer Ps having Mw within the range, the PSA sheet having high adhesive strength rise ratio may be easily obtained.

In some embodiments, the PSA layer may contain the siloxane structure-containing polymer Ps and an acrylic polymer Pa having a glass transition temperature (Tg) of 0° C. or less. When combined with the acrylic polymer Pa, the effects of the siloxane structure-containing polymer Ps may be suitably exerted. In some embodiments, the content of the siloxane structure-containing polymer Ps may be 0.1 parts by weight or more and 50 parts by weight or less to 100 parts by weight of the acrylic polymer Pa. With a Ps content within the range, a PSA sheet having a high adhesive strength rise ratio and a low thermal impedance may be easily obtained.

The PSA sheet according to some embodiments is configured as a substrate-free double-faced PSA sheet having a first adhesive face formed of one surface of the PSA layer and a second adhesive face formed of the other surface of the PSA layer. The PSA sheet having such a configuration is free of a substrate between the first and second adhesive faces, allowing its tight adhesion to a rough or uneven surface. Because of this, efficient heat transfer is enabled between the PSA sheet and adherend. The PSA sheet free of a substrate can be advantageous also from the standpoint of reducing the thermal resistance of the PSA sheet.

The combinations of the elements described hereinabove may be encompassed by the scope of the invention for which the protection by patent is sought by the present application.

BRIEF DESCRIPTION OF THE DRAWINGS

FIG. 1 shows a schematic cross-sectional diagram schematically illustrating the thermally conductive PSA sheet according to an embodiment.

FIG. 2 shows a schematic cross-sectional diagram schematically illustrating the thermally conductive PSA sheet according to another embodiment.

FIG. 3 shows a schematic cross-sectional diagram schematically illustrating the thermally conductive PSA sheet according to yet another embodiment.

FIG. 4(*a*) shows a diagram outlining the front view of the thermal analysis instrument used for determining thermal resistance in Examples and FIG. 4(*b*) shows a diagram outlining the lateral view of the instrument shown in FIG. 4(*a*).

DETAILED DESCRIPTION OF THE INVENTION

Preferable embodiments of the present invention are described below. Matters necessary to practice this invention other than those specifically referred to in this description can be understood by a person skilled in the art based on the disclosure about implementing the invention in this description and common technical knowledge at the time the application was filed. The present invention can be practiced based on the contents disclosed in this description and common technical knowledge in the subject field.

In the following drawings, components or units having the same functions may be described with the same symbols allocated and the redundant description may be omitted or simplified. The embodiments illustrated in the drawings are schematic in order to clearly describe the present invention and the drawings do not accurately represent the size or scale of products actually provided.

As used herein, the term "acrylic polymer" refers to a polymer having a monomeric unit derived from a (meth) acrylic monomer in the polymer structure and typically refers to a polymer containing over 50% by weight monomer ic units derived from a (meth)acrylic monomer. The term "(meth)acrylic monomer" refers to a monomer having at least one (meth)acryloyl group in one molecule. In this context, it is intended that the term "(meth)acryloyl group" collectively refers to an acryloyl group and a methacryloyl group. Therefore, the concept of "(meth)acrylic monomer" as used herein may encompass both an acrylic monomer having an acryloyl group and a methacrylic monomer having a methacryloyl group. Similarly, it is intended that the term "(meth)acrylic acid" as used herein collectively refers to acrylic acid and methacrylic acid and the term "(meth) acrylate" collectively refers to an acrylate and a methacrylate.

<Structural Examples of the PSA Sheet>

The PSA sheet as disclosed herein includes a PSA layer. The PSA sheet disclosed herein may be a substrate-free double-faced PSA sheet having a first adhesive face formed of one surface of the PSA layer and a second adhesive face formed of the other surface of the PSA layer. Alternatively, the PSA sheet disclosed herein may be a substrate-supported PSA sheet in which the PSA layer is layered on one or each face of a support substrate. Hereinafter, the support substrate may be simply referred to as a "substrate."

FIG. 1 schematically illustrates the structure of the PSA sheet according to an embodiment. PSA sheet is configured as a substrate-free double-faced PSA sheet formed of a PSA layer 21. PSA sheet is used by applying the first adhesive face 21A formed of one surface (first face) of PSA layer 21 and the second adhesive face 21B formed of the other surface (second face) of PSA layer 21 to different locations of adherend(s). The locations to which the adhesive faces 21A and 21B are applied can be the corresponding locations of different members or different locations of a single member. As shown in FIG. 1, PSA sheet prior to use (i.e. before applied to an adherend) may be a constituent of a release-linered PSA sheet 100 in which the first and second adhesive faces 21A and 21B are protected by release liners 31 and 32 each having a release face at least on the side facing the PSA layer 21. The release liners 31 and 32 which may be preferably used are, for example, those respectively having a release layer provided by treatment with a release treatment agent on one side of a sheet-shaped substrate (liner substrate) so that the side serves as a release surface. Alternatively, omitting release liner 32, a release liner 31 having release faces on both sides may be used; this release liner 31 and the PSA sheet 1 may be layered and wound together to form a roll of a release-linered PSA sheet in which the second adhesive face 21B is abutted and protected by the backside of release liner 31.

FIG. 2 schematically illustrates the structure of a PSA sheet according to an embodiment. The PSA sheet 2 is configured as a single-faced PSA sheet with a substrate, including a support substrate sheet (such as a resin film) 10 having a first surface 10A and a second surface 10B, and a PSA layer 21 provided on the side of the first surface 10A. The PSA layer 21 is provided securely on the side of the first surface 10A of the support substrate 10, namely provided without intending to separate the PSA layer 21 from the support substrate 10. As shown in FIG. 2, PSA sheet 2 prior to use may be a constituent of a release-linered PSA sheet 200 in which the surface (adhesive face) 21A of the PSA layer 21 is protected by release liner 31 having a release surface at least on the side facing the PSA layer 21. Alternatively, omitting release liner 31, a support substrate 10 having a second surface 10B that serves as a release surface may be used and PSA sheet 2 may be wound to form a roll in which the adhesive face 21A is abutted and protected by the second face 10B of support substrate 10.

FIG. 3 schematically illustrates the structure of the PSA sheet according to yet another embodiment. PSA sheet 3 is configured as a substrate-supported double-faced PSA sheet comprising a support substrate sheet (e.g. resin film) 10 having first and second faces 10A and 10B, a first PSA layer 21 fixed to the first face 10A side and a second PSA layer 22 fixed to the second face 10B side. As shown in FIG. 3. PSA sheet 3 prior to use may be a constituent of a release-linered PSA sheet 300 in which the surfaces (first and second adhesive faces) 21A and 22A of PSA layer 21 are protected by release liners 31 and 32. Alternatively, omitting release liner 32, a release liner 31 having release faces on both sides may be used; this release liner 31 and the PSA sheet 3 may be layered and wound together to form a roll of a release-linered PSA sheet in which the second adhesive face 22A is abutted and protected by the backside of release liner 31.

The concept of PSA sheet herein may encompass so-called PSA tapes. PSA films. PSA labels, etc. The PSA sheet can be in a roll or in a flat sheet or may be cut or punched out into a suitable shape according to the purpose and application. The PSA layer in the art disclosed herein is typically formed in a continuous form, but is not limited to this. For instance, it may be formed in a regular or random pattern of dots, stripes, etc.

<Properties of PSA Sheet>

Because the thermally conductive PSA sheet disclosed herein has a thermal resistance (by a stationary heat flow method; the same applies, hereinafter) less than 6.0 cm$^2$·K/W, it can be favorably used for purposes such as heat radiation of adherends. From the standpoint of enhancing the heat radiation effect, the thermal resistance is preferably less than 4.0 cm$^2$·K/W, more preferably less than 3.0 cm$^2$·K/W. or yet more preferably less than 2.5 cm$^2$·K/W. In some embodiments, the thermal resistance can be less than 2.0 cm$^2$·K/W, or even less than 1.5 cm$^2$·K/W. The minimum thermal resistance is not particularly limited. In view of the balance with other properties, in some embodiments, the thermal resistance can be, for instance, 0.2 cm$^2$·K/W or greater, 0.3 cm$^2$·K/W or greater, 0.5 cm$^2$·K/W or greater, 0.7 cm$^2$·K/W or greater, or even 1.0 cm$^2$·K/W or greater. The PSA sheet disclosed herein can be favorably made in an embodiment where the thermal resistance is, for instance, 0.2 cm$^2$·K/W or greater and less than 6.0 cm$^2$·K/W, 0.5 cm$^2$·K/W or greater and less than 3.0 cm$^2$·K/W, 0.7 cm$^2$·K/W or greater and less than 2.5 cm$^2$·K/W, or 1.0 cm$^2$·K/W or greater and less than 2.5 cm$^2$·K/W.

The thermal conductivity (by a stationary heat flow method; the same applies, hereinafter) of the PSA sheet is not particularly limited. From the standpoint of obtaining a thermal resistance less than 6.0 cm$^2$·K/W in a thicker PSA sheet as well, the higher the thermal conductivity is, the more advantageous it is. In some embodiments, the thermal conductivity can be, for instance, 0.3 W/m·K or greater, 0.4 W/m·K or greater, or even 0.5 W/m·K or greater. The maximum thermal conductivity is not particularly limited. In view of the balance with other properties, in some embodiments, the thermal conductivity can be, for instance, 2.0 W/m·K or less, 1.5 W/m·K or less, 1.0 W/m·K or less, or even less than 1.0 W/m·K.

As used herein, the thermal resistance and thermal conductivity of a PSA sheet refer to values determined by a stationary heat flow method. More specifically, the thermal resistance and thermal conductivity of a PSA sheet can be determined by the method described later in Examples.

The PSA sheet disclosed herein has an adhesive strength rise ratio (N2/N1) of 2 or higher, for instance, 2.0 or higher. From the standpoint of combining initial low adhesion and in-use strong adhesion at a higher level in some embodiments, the adhesive strength rise ratio (N2/N1) can be, for instance, 2.5 or higher, or even 3.5 or higher. The maximum adhesive strength rise ratio (N2N1) is not particularly limited. From the standpoint of the ease and cost-effectiveness of manufacturing the PSA sheet, it can be, for instance, 100 or lower, 80 or lower, 50 or lower, 30 or lower, 20 or lower, or even 15 or lower. For instance, the PSA sheet disclosed herein can be favorably made in an embodiment where the adhesive strength rise ratio (N2N1) is 2 or higher and 20 or lower, or 2 or higher and 15 or lower.

The adhesive strength rise ratio (N2/N1) is defined as the initial adhesive strength (N/20 mm) to post-heat adhesive strength (N/20 mm) ratio. The initial adhesive strength is obtained by press-bonding the PSA sheet to a stainless steel (SUS) plate as the adherend, leaving the resultant standing in an environment at 23° C., and 50% RH for 30 minutes, and measuring the 180° peel strength at a peel angle of 180° at a tensile speed of 300 mm/min. The post-heat adhesive strength (N/20 mm) is obtained by press-bonding the PSA sheet to a SUS plate as the adherend, heating the resultant at 80° C. for 5 minutes, leaving it standing in an environment at 23° C., and 50% RH for 30 minutes, and measuring the 180° peel strength at a peel angle of 180° at a tensile speed of 30 mm/min under the environment. As the adherend, a SUS304 BA plate is used for initial adhesive strength as well as for post-heat adhesive strength. The initial adhesive strength and post-heat adhesive strength can be determined based on the method described later in Examples.

The initial adhesive strength and post-heat adhesive strength are preferably determined using 20 mm wide test pieces. When using a test piece having a width of X mm rather than 20 mm, the adhesive strength (N/Xmm) obtained with respect to the test piece can be multiplied by 20/X to convert the value to the adhesive strength per 20 mm width (N/20 mm). When a double-faced PSA sheet is subject to measurement, it is desirable to adhere a non-adhesive film (e.g. plastic film) to the adhesive face not subject to measurement so as to avoid lowering of the workability caused by sticking of the adhesive face.

The post-heat adhesive strength of the PSA sheet disclosed herein can be, for instance, 5 N/20 mm or greater, or even 10 N/20 mm or greater. A higher post-heat adhesive strength is preferable from the standpoint of enhancing the reliability of bonding after an adhesive strength rise (e.g. while in use on an adherend). A high post-heat adhesive strength is advantageous also from the standpoint of maintaining tight adhesion with the adherend for efficient heat transfer with the adherend. In some embodiments, the post-heat adhesive strength is preferably 15 N/20 mm or greater, more preferably 20 N/20 mm or greater, or yet more preferably 25 N/20 mm or greater. The maximum post-heat adhesive strength is not particularly limited. From the standpoint of easily combining it with good reworkability for application, in some embodiments, the post-heat adhesive strength can be, for instance, 60 N20 mm or less, 50 N/20 mm or less, or even 40 N/20 mm or less.

The initial adhesive strength of the PSA sheet disclosed herein is not particularly limited as long as it meets a desirable adhesive strength rise ratio relative to the post-heat adhesive strength. The initial adhesive strength is usually suitably 20 N/20 mm or less, or preferably 15 N/20 mm or less. According to the PSA sheet with lower initial adhesive strength, better workability tends to be obtained. From such a standpoint, in some embodiments, the initial adhesive strength can be, for instance, 12.5 N/20 mm or less, 10 N/20 mm or less, 7.5 N/20 mm or less, or even 5 N20 mm or less. The minimum initial adhesive strength is not particularly limited. It can be, for instance, 0.01 N/20 mm or greater. From the standpoint of the ease of application to adherends, etc., the initial adhesive strength is usually suitably 0.1 N20 mm or greater. In some embodiments, the initial adhesive strength can be, for instance, 0.5 N/20 mm or greater, 1 N/20 mm or greater, or even 2 N/20 mm or greater. In view of facilitating placement for application and enhancing tightness of adhesion to the adherend surface (e.g. surface-conformability), it may be advantageous that the initial adhesive strength is not excessively low.

The PSA sheet according to some preferable embodiments, the post-heat adhesive strength is greater than the initial adhesive strength by at least 10 N/20 mm. In other words, the difference between the post-heat adhesive strength and the initial adhesive strength (N2−N1) is 10 N/20 mm or greater. According to the PSA sheet in such an embodiment, adherend-fixing ability can be favorably combined with reworkability. The difference (N2−N1) can be 12 N/20 mm or greater, 15 N/20 mm or greater, 18 N/20 mm or greater, or even 20 N/20 mm or greater. The upper limit of the difference (N2−N1) is not particularly limited. For instance, it can be less than 60 N/20 mm, less than 50 N20 mm, or less than 40 N20 mm.

The post-heat adhesive strength of the PSA sheet disclosed herein represents a certain property of the PSA sheet, but does not limit the application of the PSA sheet. In other words, the application of the thermally conductive PSA sheet disclosed herein is not limited to an embodiment involving 5 minutes of heating at 80° C. For instance, the thermally conductive PSA sheet disclosed herein can be preferably used in an embodiment where it is not purposefully heated to a temperature higher than a room temperature range (usually 20° C. to 30° C., typically 23° C. to 25° C.). Even in such an embodiment, with a long lapse of time, or with an unintentional temperature increase caused by the application of the PSA sheet or by the environment of use and so on, or because of multiple causes including these, the thermally conductive PSA sheet disclosed herein can show higher adhesive strength after applied to an adherend, thereby achieving strong bonding.

With respect to the PSA sheet disclosed herein, at an arbitrary time after its application, a temperature higher than a room temperature range can be applied to facilitate an increase in adhesive strength. The applied temperature is not particularly limited and can be selected in view of the workability, cost-effectiveness, convenience, heat resistance of the adherend, etc. The temperature can be, for instance, below 150° C., 120° C. or below, 100° C. or below, 80° C. or below, or even 70° C. or below. In some embodiments, the temperature can be 60° C. or below, 50° C. or below, or even 45° or below. The temperature can be, for instance, 35° or above 50° C. or above, or 60° or above; it may also be 80° C. or above, or even 100° C. or above. At a higher temperature, the adhesive strength can be increased in a shorter time of processing. The time for applying the temperature is not particularly limited. It can be, for instance, 1 hour or less, 30 minutes or less, 20 minutes or less, 15 minutes or less, 10 minutes or less, or even 5 minutes or less. The time for applying the temperature is can be, for instance, 1 minute or more, 3 minutes or more, 7 minutes or more, or even 15 minutes or more. Alternatively, the temperature can be applied for a longer time as long as it is limited to avoid significant thermal degradation of the PSA sheet or adherend. The temperature can be applied at once or stepwise.

With the thermally conductive filler in the PSA layer, the PSA sheet disclosed herein can achieve efficient heat transfer within the PSA layer. Because of this, for instance, as compared to a PSA layer having a composition free of a thermally conductive filler, the adhesive strength can be effectively increased by heating under milder conditions. Here, heating under mild conditions (mild heating) means heating at a temperature lower than 80° C. (e.g. at or below 70° C., at or below 60° C. at or below 50° C., at or below 45° C., etc.) and higher than a room temperature range (e.g. at or above 35° C.). The time for applying the temperature is not particularly limited. For instance, a preferable PSA sheet can achieve a large increase in adhesive strength when heated under the mild conditions for 30 minutes or less as well.

In some embodiments of the PSA sheet disclosed herein, the PSA sheet may have an adhesive strength N3 (post-mild-heat adhesive strength) at 23° C. after subjected to 15 minutes of heating at 50° C. after applied to a stainless steel plate, with N3 being at least 1.3 times the adhesive strength N1 (initial adhesive strength). That is, the post-mild-heat adhesive strength to initial adhesive strength ratio (N3/N1) can be 1.3 or higher. In the PSA sheet in such an embodiment, the adhesive strength N2 (post-heat adhesive strength) to adhesive strength N1 (initial adhesive strength) ratio, that is, the adhesive strength rise ratio (N2/N1), is not particularly limited. For instance, N2/N1 in such an embodiment may be 2 or more, or it may be less than 2. In the embodiment, the post-mild-heat adhesive strength to initial adhesive strength ratio (N3/N1) is preferably 1.5 or higher, or more preferably 1.7 or higher it can be 2.0 or higher, 2.5 or higher, 3.0 or higher, or even 3.5 or higher. From the standpoint of the ease and cost-effectiveness of manufacturing the PSA sheet, the N3/N1 ratio can be, for instance, 100 or lower, 80 or lower, 50 or lower, 30 or lower, 20 or lower, or even 15 or lower. For instance, the PSA sheet disclosed herein can be favorably made in an embodiment where the N3/N1 ratio is 1.5 or higher and 20 or lower, or 1.7 or higher and 15 or lower.

In some embodiments of the PSA sheet disclosed herein, the adhesive strength N2 (post-heat adhesive strength) to adhesive strength N3 (post-mild-heat adhesive strength) ratio (N2/N3) can be, for instance, 0.7 or higher, 0.75 or higher, 0.8 or higher, or even 0.9 or higher. The maximum N2/N3 ratio value is not particularly limited; it is usually 1.5 or lower, or typically 1.2 or lower, for instance, 1.0 or lower.

In some embodiments of the PSA sheet disclosed herein, the adhesive strength N3 (post-mild-heat adhesive strength) of the PSA sheet can be, for instance, 5 N/20 mm or greater, or even 10 N/20 mm or greater. A higher post-mild-heat adhesive strength is preferable from the standpoint of enhancing the reliability of bonding after an adhesive strength rise (e.g. while in use on an adherend). A high post-mild-heat adhesive strength is advantageous also from the standpoint of maintaining tight adhesion with the adherend for efficient heat transfer with the adherend. In some embodiments, the post-mild-heat adhesive strength is preferably 15 N/20 mm or greater, more preferably 18 N/20 mm or greater, or yet more preferably 22 N/20 mm or greater. The maximum post-mild-heat adhesive strength is not particularly limited. From the standpoint of easily combining it with good reworkability for application, in some embodiments, the post-mild-heat adhesive strength can be, for instance, 60 N/20 mm or less, 50 N/20 mm or less, or even 40 N/20 mm or less.

With the low thermal resistance, the PSA sheet disclosed herein can be favorably used for heat radiation of the adherend, etc. When the PSA sheet used for such a purpose works to radiate heat, heat is transferred from the adherend subject to heat radiation to the PSA sheet. The PSA sheet can use this heat to facilitate an increase in adhesive strength. According to such an application, the adhesive strength of the PSA sheet can be effectively increased to provide strong adhesive strength suited for fixing adherends even if intentional heating solely for the purpose of increasing adhesive strength is not carried out after application to an adherend or even if such intentional heating is carried out under milder conditions (temperature, time, etc.).

The thickness of the PSA sheet is not particularly limited; it can be, for instance, 3 μm or greater, 5 μm or greater, or 10 μm or greater. From the standpoint of reducing deterioration of surface smoothness caused by the use of thermally conductive filler and readily obtaining the effect to increase the post-heat adhesive strength, the thickness of the PSA sheet can be, for instance, 25 μm or greater, 40 μm or greater, 50 μm or greater, or even greater than 50 μm. From the standpoint of obtaining greater fixing ability, in some embodiments, the PSA sheet's thickness can be, for instance, 55 μm or greater, 65 μm or greater, 80 μm or greater, or even 90 μm or greater. On the other hand, to lower the thermal resistance, the thinner the PSA sheet is, the more advantageous it is. From such a standpoint, the PSA sheet's thickness is usually suitably 1000 μm or less, or preferably 700 μm or less; it can be 500 μm or less, 400 μm or less, or even 350 μm or less. In some embodiments, the PSA sheet's thickness can be 300 μm or less, 200 μm or less, or even 150 μm or less.

<PSA Layer>

In the art disclosed herein, the PSA forming the PSA layer is not particularly limited. The PSA may comprise, as the base polymer (i.e. a component accounting for 50% by weight or more of polymers), one, two or more species among various polymers showing rubber elasticity in a room temperature range, with examples including acrylic polymers, rubber-based polymers, polyester-based polymers, urethane-based polymers, polyether-based polymers, silicone-based polymers, polyamide-based polymers, and fluorine-based polymer. The PSA layer in the art disclosed herein may be formed from a PSA composition comprising such a base polymer. The form of PSA composition is not particularly limited. For instance, it can be in various forms including a water dispersion, solvent-based, hot-melt type, and active energy ray curable (e.g. photocurable).

(Base Polymer)

The base polymer has a glass transition temperature (Tg) preferably below 0° C., more preferably below −10° C., or possibly below −20° C. A PSA comprising a base polymer with such a Tg shows suitable fluidity (e.g. mobility of polymer chains in the PSA); and therefore, it is suited for obtaining a PSA sheet with a high adhesive strength rise ratio. In some embodiments, the base polymer's Tg can be, for instance, below −30° C., below −40° C., below −50° C., or even below −60° C. The minimum Tg value of the base polymer is not particularly limited. From the standpoint of the material availability and greater cohesion of the PSA layer, it is usually favorable to use a base polymer having a Tg of −80° C. or higher.

Here, the Tg of the base polymer refers to a nominal value given in a reference book, catalog, etc., or a Tg value determined by the Fox equation based on the composition of monomers used for preparation of the base polymer. As shown below, the Fox equation is a relational expression between the Tg of a copolymer and glass transition temperatures Tgi of homopolymers obtainable by homopolymerization of the respective monomers constituting the copolymer.

$$1/Tg = \Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit K) of homopolymer of the monomer i. When the base polymer is a homopolymer, the homopolymer's Tg equals to the base polymer's Tg.

As for the glass transition temperatures of homopolymers used for Tg determination, values listed in a known document are used. In particular, values are given in "Polymer Handbook" (3rd edition. John Wiley & Sons. Inc., Year 1989). With respect to a monomer for which several values are given in Polymer Handbook, the highest value is used. For glass transition temperatures of homopolymers whose corresponding monomers mare not listed in Polymer Handbook, values obtained by the measurement method described in Japanese Patent Application Publication No. 2007-51271 can be used.

While no particular limitations are imposed, the weight average molecular weight (Mw) of the base polymer can be, for instance, about $5 \times 10^4$ or higher. With a base polymer having such a Mw, a PSA that shows good cohesion is likely to be obtained. In some embodiments, the base polymer's Mw can be, for instance, $10 \times 10^4$ or higher, $20 \times 10^4$ or higher, or even $30 \times 10^4$ or higher. The base polymer's Mw is usually suitably about $500 \times 10^4$ or lower. The base polymer with such a Mw is suited for obtaining a PSA sheet having a high adhesive strength rise ratio because it is likely to form a PSA that shows suitable fluidity (polymer chain mobility).

Here, the Mw of the base polymer or siloxane structure-containing polymer described later can be determined as a value based on standard polystyrene by gel permeation chromatography (GPC). More specifically, the Mw can be determined based on the method and conditions described later in Examples.

(Acrylic Polymer Pa)

The PSA sheet disclosed herein can be favorably made in an embodiment comprising, as the base polymer, a PSA layer that is formed of a PSA comprising an acrylic polymer Pa with a Tg of 0° C. or lower. In particular, when the siloxane structure-containing polymer Ps described later is a homopolymer or copolymer that includes a monomeric unit derived from a (meth)acrylic monomer, it is preferable to use an acrylic polymer Pa as the base polymer because it is likely to provide good compatibility with the siloxane structure-containing polymer Ps. Good compatibility between the base polymer and the siloxane structure-containing polymer Ps is advantageous from the standpoint of increasing the thermal conductivity of the PSA layer. It may also contribute to a decrease in initial adhesive strength or an increase in post-heat adhesive strength through greater mobility of the siloxane structure-containing polymer Ps within the PSA layer.

The acrylic polymer Pa can be a polymer containing at least 50% by weight monomeric unit derived from an alkyl (meth)acrylate, that is, a polymer in which an alkyl (meth) acrylate accounts for 50% by weight or more of the total amount of monomers used for preparing the acrylic polymer Pa. A preferable alkyl (meth)acrylate has a linear or branched alkyl group with 1 to 20 carbons (i.e. $C_{1-20}$). For easy balancing of properties, of the total amount of monomers, the ratio of $C_{1-20}$ alkyl (meth)acrylate can be, for instance, 50% by weight or higher, preferably 60% by weight or higher, or more preferably 70% by weight or higher. For the same reason, of the total amount of monomers, the ratio of $C_{1-20}$ alkyl (meth)acylate can be, for instance, 99.9% by weight or less, preferably 98% by weight or less, or more preferably 95% by weight or less. In some embodiments, of the total amount of monomers, the ratio of $C_{1-20}$ alkyl (meth)acrylate can be, for instance, 90% by weight or less, or even 85% by weight or less.

Non-limiting specific examples of the $C_{1-20}$ alkyl (meth) acrylate include methyl (meth)acrylate, ethyl (meth)acrylate, propyl (meth)acrylate, isopropyl (meth)acrylate, n-butyl (meth)acrylate, isobutyl (meth)acrylate, s-butyl (meth) acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth) acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, nonadecyl (meth)acrylate, and eicosyl (meth)acrylate.

Among these, it is preferable to use at least a $C_{1-18}$ alkyl (meth)acrylate and it is more preferable to use at least a $C_{1-14}$ alkyl (meth)acrylate. In some embodiments, the acrylic polymer Pa may include, as a monomeric unit, at least one species selected among $C_{4-12}$ alkyl (meth)acrylates (preferably $C_{4-10}$ alkyl acrylates such as an $C_{6-10}$ alkyl acrylates). For example, the acrylic polymer Pa preferably includes one or each of n-butyl acrylate (BA) and 2-ethylhexyl acrylate (2EHA), and the acrylic polymer Pa particularly preferably includes at least 2EHA. Examples of other $C_{1-18}$ alkyl (meth)acrylates that are preferably used include methyl acrylate, methyl methacrylate (MMA), n-butyl methacrylate (BMA), 2-ethylhexyl methacrylate (2EHMA), and isostearyl acrylate (ISTA).

In addition to the alkyl (meth)acrylate as the primary component, the monomers forming the acrylic polymer Pa may include, as necessary, another monomer (copolymerizable monomer) that is able to copolymerize with the alkyl (meth)acrylate. As the copolymerizable monomer, a monomer having a polar group (such as a carboxy group, a hydroxy group and a nitrogen atom-containing ring) may be suitably used. The monomer having a polar group may be useful for introducing a cross-linking point into the acrylic polymer or increasing cohesive strength of the acrylic polymer. For the copolymerizable monomer, solely one species or a combination of two or more species can be used.

Non-limiting specific examples of the copolymerizable monomer include those indicated below.

Carboxyl group-containing monomers: for example, acrylic acid, methacrylic acid, carboxyethyl acrylate, carboxypentyl acrylate, itaconic acid, maleic acid, fumaric acid, crotonic acid and isocrotonic acid;

Acid anhydride group-containing monomers: for example, maleic anhydride and itaconic anhydride;

Hydroxy group-containing monomers: for example, hydroxyalkyl (meth)acrylates such as 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth) acrylate, 8-hydroxyoctyl (meth)acrylate, 10-hydroxydecyl (meth)acrylate, 12-hydroxylauryl (meth)acrylate and (4-hydroxymethylcyclohexyl)methyl (meth)acrylate;

Monomers having a sulphonate group or a phosphate group: for example, styrene sulphonic acid, allyl sulphonic acid, sodium vinylsulphonate, 2-(meth)acrylamide-2-methylpropane sulphonic acid, (meth)acrylamide propane sulphonic acid, sulphopropyl (meth)acrylate, (meth)acryloyloxy naphthalenesulphonic acid and 2-hydroxyethylacryloyl phosphate;

Epoxy group-containing monomers: for example, epoxy group-containing acrylates such as glycidyl (meth)acrylate and (meth)acrylate-2-ethyl glycidyl ether, allyl glycidyl ether and (meth)acrylate glycidyl ether;

Cyano group-containing monomers: for example, acrylonitrile and methacrylonitrile:

Isocyanato group-containing monomers: for example, 2-isocyanatoethyl (meth)acrylate;

Amido group-containing monomers: for example, (meth) acrylamide; N,N-dialkyl (meth)acrylamides such as N,N-dimethyl(meth)acrylamide, N,N-diethyl(meth)acrylamide, N,N-dipropyl(meth)acrylamide, N,N-diisopropyl(meth) acrylamide, N,N-di(n-butyl)(meth)acrylamide and N,N-di(t-butyl) (meth)acrylamide; N-alkyl (meth)acrylamides such as N-ethyl(meth)acrylamide, N-isopropyl(meth)acrylamide, N-butyl(meth)acrylamide and N-n-butyl(meth)acrylamide; N-vinylcarboxylic acid amides such as N-vinylacetamide; a monomer having a hydroxy group and an amide group, for example, an N-hydroxyalkyl(meth)acrylamide such as N-(2-hydroxyethyl)(meth)acrylamide, N-(2-hydroxypropyl) (meth)acrylamide, N-(1-hydroxypropyl)(meth)acrylamide, N-(3-hydroxypropyl)(meth)acrylamide, N-(2-hydroxybutyl) meth)acrylamide, N-(3-hydroxybutyl)(meth)acrylamide, and N-(4-hydroxybutyl)(meth)acrylamide; a monomer having an alkoxy group and an amide group, for example, an N-alkoxyalkyl(meth)acrylamide such as N-methoxymethyl (meth)acrylamide, N-methoxyethyl(meth)acrylamide, and N-butoxymethyl(meth)acrylamide; and N,N-dimethylaminopropyl(meth)acrylamide, N-(meth)acryloylmorpholine, etc.

Monomers having a nitrogen atom-containing ring: for example, N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinylmorpholine, N-vinyl-3-morpholinone, N-vinyl-2-caprolactam, N-vinyl-1,3-oxazin-2-one, N-vinyl-3,5-morpholinedione, N-vinylpyrazole, N-vinylisoxazole, N-vinylthiazole, N-vinylisothiazole and N-vinylpyridazine (such as lactams including N-vinyl-2-caprolactam);

Monomers having a succinimide skeleton: for example, N-(meth)acryloyloxy methylene succinimide, N-(meth)acryloyl-6-oxy hexamethylene succinimide and N-(meth)acryloyl-8-oxy hexamethylene succinimide;

Maleimides: for example, N-cyclohexylmaleimide, N-isopropylmaleimide, N-laurylmaleimide and N-phenylmaleimide;

Itaconimides: for example, N-methyl itaconimide, N-ethyl itaconimide, N-butyl itaconimide, N-octyl itaconimide, N-2-ethylhexyl itaconimide, N-cyclohexyl itaconimide and N-lauryl itaconimide;

Aminoalkyl (meth)acrylates: for example, aminoethyl (meth)acrylate, N,N-dimethylaminoethyl (meth)acrylate, N,N-diethylaminoethyl (meth)acrylate and t-butylaminoethyl (meth)acrylate:

Alkoxy group-containing monomers: for example, an alkoxyalkyl (meth)acrylate such as 2-methoxyethyl (meth)acrylate, 3-methoxypropyl (meth)acrylate, 2-ethoxyethyl (meth)acrylate, propoxyethyl (meth)acrylate, butoxyethyl (meth)acrylate and ethoxypropyl (meth)acrylate; and an alkoxy alkylene glycol (meth)acrylate such as methoxy ethylene glycol (meth)acrylate, methoxy propylene glycol (meth)acrylate, methoxy poly(ethylene glycol) (meth)acylate and methoxy poly(propylene glycol) (meth)acrylate:

Vinyl esters: for example, vinyl acetate and vinyl propionate;

Vinyl ethers: for example, vinyl alkyl ethers such as methyl vinyl ether and ethyl vinyl ether;

Aromatic vinyl compounds: for example, styrene, α-methylstyrene and vinyl toluene;

Olefins: for example, ethylene, butadiene, isoprene and isobutylene;

(Meth)acrylic esters having an alicyclic hydrocarbon group: for example, cyclopentyl (meth)acrylate, cyclohexyl (meth)acrylate, isobornyl (meth)acrylate and dicyclopentanyl (meth)acrylate;

(Meth)acrylic esters having an aromatic hydrocarbon group: for example, phenyl (meth)acrylate, phenoxyethyl (meth)acrylate and benzyl (meth)acrylate;

Heterocyclic ring-containing (meth)acrylates such as tetrahydrofurfuryl (meth)acrylate, halogen atom-containing (meth)acrylates such as vinyl chloride and fluorine atom-containing (meth)acrylates, silicon atom-containing (meth)acrylates such as silicone (meth)acrylate, (meth)acrylic esters obtained from terpene compound derivative alcohols, and the like.

When using such a copolymerizable monomer, its amount used is not particularly limited, but it is usually suitably at least 0.01% by weight of the total amount of monomers. From the standpoint of obtaining greater effect of the use of the copolymerizable monomer, the amount of copolymerizable monomer used can be 0.1% by weight or more of the total amount of monomers, or even 1% by weight or more.

The amount of copolymerizable monomer used can be 50% by weight or less of the total amount of monomers, or preferably 40% by weight or less. This can prevent the PSA from gaining excessively high cohesive strength, thereby increasing the tackiness at normal temperature (for instance, at 25° C.).

In some embodiments, the monomers used for preparing the acrylic polymer Pa preferably comprises at least one monomer selected from the group consisting of an N-vinyl cyclic amide represented by the following general formula (M1) and a hydroxy group-containing monomer (possibly a monomer having a hydroxy group and other functional group, e.g. a monomer having a hydroxy group and an amide group).

[Chem 1]

(M1)

Here, $R^1$ in the general formula (M1) is a divalent organic group.

With the use of the N-vinyl cyclic amide, the cohesive strength and polarity of the PSA can be adjusted and the post-heat adhesive strength may be improved. Specific examples of the N-vinyl cyclic amide include N-vinyl-2-pyrrolidone, N-vinyl-2-piperidone, N-vinyl-3-morpholinone, N-vinyl-2-caprolactam, N-vinyl-1,3-oxazin-2-one, and N-vinyl-3,5-morpholinedione, N-vinyl-2-pyrolidone and N-vinyl-2-caprolactam are particularly preferable.

The amount of N-vinyl cyclic amide used is not particularly limited. It is usually suitably 0.01% by weight or more (preferably 0.1% by weight or more, e.g. 0.5% by weight or more) of the total amount of monomers used for preparing the acrylic polymer Pa. In some embodiments, the amount of N-vinyl cyclic amide used can be 1% by weight or more of the total amount of monomers, 5% by weight or more, occasionally 10% by weight or more, or even 15% by weight or more. From the standpoint of increasing the tackiness at normal temperature (for instance, at 25° C.) or the flexibility at a low temperature, the amount of N-vinyl cyclic amide used is usually suitably 40% by weight or less of the total amount of monomers, it can be 30% by weight or less, 20% by weight or less, less than 15% by weight or even less than 10% by weight.

With the use of the hydroxy group-containing monomer, the cohesive strength and polarity of the PSA can be adjusted and the post-heat adhesive strength may be improved. Specific examples of hydroxy group-containing monomers that can be favorably used include 2-hydroxyethyl (meth)acrylate, 4-hydroxybutyl (meth)acylate, 6-hydroxyhexyl (meth)acrylate and N-(2-hydroxyethyl)meth)acrylamide. Among others, preferable examples include 2-hydroxyethyl acrylate (HEA), 4-hydroxybutyl acrylate (4HBA), and N-(2-hydroxyethyl)acrylamide (HEAA).

The amount of hydroxy group-containing monomer used is not particularly limited. In typical, it is suitably 0.01% by weight or more (preferably 0.1% by weight or more, e.g. 0.5% by weight or more) of the total amount of monomers used for preparing the acrylic polymer Pa. In some embodiments, the amount of hydroxy group-containing monomer used may be 1% by weight or more, 5% by weight or more or 10% by weight or more of the total amount of monomers. From the viewpoint of obtaining greater tackiness at normal temperature (for instance, at 25° C.) and greater flexibility at low temperatures, the amount of hydroxy group-containing monomer used is generally suitably 40% by weight or less of the total amount of monomers it can be 30% by weight or less 20% by weight or less, 10% by weight or less or even 5% by weight or less.

In some embodiments, as the copolymerizable monomer, an N-vinyl cyclic amide and a hydroxy group-containing monomer can be used together. In this case, the total amount of N-vinyl cyclic amide and the hydroxy group-containing monomer may be, for example, 0.1% by weight or more, 1% by weight or more, 5% by weight or more, 7% by weight or more, 10% by weight or more, 15% by weight or more or even 20% by weight or more of the total amount of monomers used for preparing the acrylic polymer Pa. The total amount of N-vinyl cyclic amide and the hydroxy group-containing monomer may be, for example, 50% by weight or less, 40% by weight or less, 30% by weight or less or even 25% by weight or less of the total amount of monomers.

In some embodiments, the acrylic polymer Pa may comprise, as a monomeric unit at least one species of alkoxy group-containing monomer. The alkoxy group-containing monomer is a monomer having at least an alkoxy group and optionally having other functional group (for instance, an amide group). The use of the alkoxy group-containing monomer can enhance the tightness of adhesion of the PSA layer to the adherend, enabling efficient heat transfer from the adherend. As the alkoxy group-containing monomer, 2-methoxyethyl acrylate, 2-methoxyethyl methacrylate and the like can be preferably used. Among them, 2-methoxyethyl acrylate (MEA) is preferable.

The amount of alkoxy group-containing monomer used is not particularly limited. It is usually suitably 30% by weight or less of the total amount of monomers; it can also be 25% by weight or less, 20% by weight or less, or even 15% by weight or less. The amount of alkoxy group-containing monomer used can be more than 0% by weight of the total amount of monomers, 0.5% by weight or more, 1% by weight or more, 3% by weight or more, 5% by weight or more, or even 10% by weight or more. Alternatively, no alkoxy group-containing monomer may be used.

The method for obtaining the acrylic polymer is not particularly limited. Various polymerization methods known as synthetic methods of acrylic polymers may be appropriately employed such as solution polymerization, emulsion polymerization, bulk polymerization, suspension polymerization and photopolymerization. In some embodiments, solution polymerization or photopolymerization may be preferably employed. The polymerization temperature for solution polymerization may be appropriately selected according to the monomers and solvent used, the polymerization initiator, etc. The polymerization temperature can be, for example, about 20° C. to 170° C. (typically about 40° C. to 140° C.).

The initiator used for polymerization may be appropriately selected according to the polymerization method from heretofore known thermal polymerization initiators, photopolymerization initiators and the like. For the polymerization initiator, solely one species or a combination of two or more species can be used.

Examples of the thermal polymerization initiator include azo polymerization initiators (such as 2,2'-azobisisobutyronitrile, 2,2'-azobis-2-methylbutyronitrile, dimethyl 2,2'-azobis(2-methylpropionate), 4,4'-azobis-4-cyanovalerianic acid, azobis isovaleronitrile, 2,2'-azobis(2-amidinopropane) dihydrochloride, 2,2'-azobis[2-(5-methyl-2-imidazolin-2-yl) propane] dihydrochloride, 2,2'-azobis(2-methylpropionamidine) disulfate and 2,2'-azobis(N,N'-dimethyleneisobutyl-amidine) dihydrochloride); persulfates such as potassium persulfate; peroxide polymerization initiators (such as dibenzoyl peroxide, t-butyl persulfate and lauroyl peroxide); and redox polymerization initiators. The amount of thermal polymerization initiator used is not particularly limited, and may be, for example, in the range of 0.01 part by weight to 5 parts by weight and preferably 0.05 part by weight to 3 parts by weight relative to 100 parts by weight of monomers used for preparing the acrylic polymer.

The photopolymerization initiator is not particularly limited and examples thereof that may be used include benzoin ether photopolymerization initiators, acetophenone photopolymerization initiators. α-ketol photopolymerization initiators, aromatic sulphonyl chloride photopolymerization initiators, photoactive oxime photopolymerization initiators, benzoin photopolymerization initiators, benzyl photopolymerization initiators, benzophenone photopolymerization initiators, ketal photopolymerization initiators, thioxanthone photopolymerization initiators, acylphosphine oxide photopolymerization initiators and the like. The amount of photopolymerization initiator used is not particularly limited, and may be, for example, in the range of 0.01 part by weight to 5 parts by weight and preferably 0.05 part by weight to 3 parts by weight relative to 100 parts by weight of monomers used for preparing the acrylic polymer.

In some embodiments, the PSA composition for forming PSA layers may include the acrylic polymer Pa as a partial polymer (acrylic polymer syrup) obtainable by subjecting a mixture of monomers with a polymerization initiator to UV irradiation to polymerize part of the monomers. The PSA composition containing such acrylic polymer syrup is applied to a certain substrate and irradiated with UV to complete the polymerization. In other words, the acrylic polymer syrup can be thought as a precursor of the acrylic polymer Pa. The PSA layer disclosed herein can be formed, using, for instance, a PSA composition that includes the acrylic polymer Pa in the acrylic polymer syrup form and further includes a siloxane structure-containing polymer Ps described later.

(Siloxane Structure-Containing Polymer Ps)

The PSA layer may include, as necessary, a component other than the base polymer (e.g. acrylic polymer Pa). A favorable example of the optional component is a siloxane structure-containing polymer Ps. The siloxane structure-containing polymer Ps is defined as a polymer having a siloxane structure (Si—O—Si structure) in the molecule. With the mobility and low polarity of the siloxane structure, the siloxane structure-containing polymer Ps may serve as an adhesive strength rise retarder that contributes to a lower initial adhesive strength and a higher adhesive strength rise ratio. As the siloxane structure-containing polymer Ps (or abbreviated to a "polymer Ps" hereinafter), a polymer having a siloxane structure in a side chain can be preferably used.

The polymer Ps preferably includes a monomer having a polyorganosiloxane skeleton (or a "monomer S1" hereinafter) as a monomeric unit. The monomer S1 is not particularly limited and an arbitrary monomer containing a polyorganosiloxane skeleton can be used. Due to the low polarity attributed to its structure, such a polyorganosiloxane skeleton-containing monomer facilitates concentration of the polymer Ps in the PSA layer surface in the PSA sheet prior to use (before applied to an adherend), thereby exhibiting light release (low adhesiveness) initially upon application.

As the monomer S1, for instance, a compound represented by the general formula (1) or (2) below can be used. More specific examples include mono-terminally reactive silicone oils X-22-174ASX, X-22-2426, X-22-2475 and KF-2012 available from Shin-Etsu Chemical Co., Ltd. For the monomer S1, solely one species or a combination of two or more species can be used.

[Chem 2]

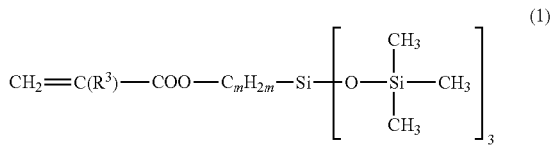

(1)

[Chem 3]

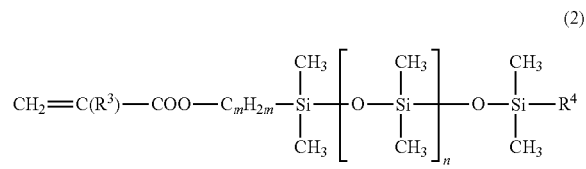

(2)

In general formulas (1) and (2), $R^3$ is a hydrogen or a methyl group; $R^4$ is a methyl group or a monovalent organic group; and m and n are integers of 0 or higher.

The functional group equivalent weight of monomer S1 is, for instance, preferably 700 g/mol or greater and less than 15000 g/mol, more preferably 800 g/mol or greater and less than 10000 g/mol, yet more preferably 850 g/mol or greater and less than 6000 g/mol, or particularly preferably 1500 g/mol or greater and less than 5000 g/mol. When the functional group equivalent weight of monomer S1 is less than 700 g/mol, the initial adhesive strength may not be reduced sufficiently. When the functional group equivalent weight of monomer S1 is 15000 g/mol or greater, the adhesive strength rise may be insufficient. When the functional group equivalent weight of monomer S1 is in the aforementioned ranges, it is easy to adjust the compatibility (e.g. compatibility with the base polymer) and mobility within the PSA layer in suitable ranges and obtain a PSA sheet that combines initial low adhesion and in-use strong adhesion at a high level.

Here, the "functional group equivalent weight" means the weight of main skeleton (e.g. polydimethylsiloxane) bonded to one functional group. For the unit g/mol, the value is converted to per 1 mol of functional groups. The functional group equivalent weight of monomer S1 can be determined from spectrum intensities of $^1$H-NMR (proton NMR) based on nuclear magnetic resonance (NMR). The functional group equivalent weight (g/mol) of monomer S1 based on $^1$H-NMR spectrum intensities can be determined based on a general structural analysis method about $^1$H-NMR spectrum analysis, if necessary, with reference to the teaching of Japanese Patent No. 5951153.

When two or more different monomers varying in functional group equivalent weight are used as the monomer S1, their arithmetic average value can be used as the functional group equivalent weight of monomer S1. In other words, the functional group equivalent weight (eq. wt.) of monomer S1 consisting of n number of different monomers (monomers $S1_1$, $S1_2$ ... $S1_n$) with varied functional group equivalent weights can be determined by the equation shown below.

Monomer $S1$'s functional group eq. wt. (g/mol)=
(functional group eq. wt. of monomer $S1_1$× amount of monomer $S1_1$+functional group eq. wt. of monomer $S1_2$×amount of monomer $S1_2$+ ... +functional group eq. wt. of monomer $S1_n$×amount of monomer $S1_n$)/(amount of monomer $S1_1$+amount of monomer $S1_2$+ ... +amount of monomer $S1_n$)

Relative to all monomers used for preparing the polymer Ps, the monomer S1 content can be, for instance, 5% by weight or greater. From the standpoint of obtaining greater effect as the adhesive strength rise retarder, it is preferably 10% by weight or greater, or possibly 15% by weight or greater. From the standpoint of the polymerization reactivity and compatibility, relative to all monomers used for preparing the polymer Ps, the monomer S1 content is suitably 60% by weight or less; it can be 50% by weight or less, 40% by weight or less, or even 30% by weight or less. When the monomer S1 content is less than 5% by weight, the initial adhesive strength may not be reduced sufficiently. When the monomer S1 content is greater than 60% by weight, the adhesive strength rise may be insufficient.

In addition to the monomer S1, the monomeric units forming the polymer Ps may include, as necessary, a (meth)acrylic monomer copolymerizable with the monomer S1 or other copolymerizable monomer(s). For instance, by copolymerizing one, two or more species of (meth)acrylic monomers and the monomer S1, the compatibility between the polymer Ps and the base polymer (e.g. acrylic polymer Pa) can be favorably adjusted.

An example of the (meth)acrylic monomer is an alkyl (meth)acrylate. For instance, one, two or more species exemplified earlier as the alkyl (meth)acrylates that may be used for the acrylic polymer Pa can be used. In some embodiments, the polymer Ps may include, as the monomeric unit, at least one species of $C_{4-12}$ alkyl (meth)acrylate (preferably $C_{4-10}$ alkyl (meth)acrylate, e.g. $C_{6-10}$ alkyl (meth)acrylate). In some other embodiments, the polymer Ps may include, as the monomeric unit, at least one species of $C_{1-18}$ alkyl methacrylate (preferably $C_{1-14}$ alkyl methacrylate, e.g. $C_{1-10}$ alkyl methacrylate). The monomeric units forming the polymer Ps may include one, two or more species selected among, for instance. MMA, BMA and 2EHMA.

Other examples of the (meth)acrylic monomer include a (meth)acrylate having an alicyclic hydrocarbon group. For example, cyclopentyl (meth)acrylate, cyclohexyl (meth)acrylate, isobornyl (meth)acrylate, dicyclopentanyl (meth)acrylate, 1-adamantyl (meth)acrylate or the like may be used. In some embodiments, the polymer Ps may contain as a monomeric unit at least one species selected from dicyclopentanyl methacrylate, isobornyl methacrylate and cyclohexyl methacrylate.

The amount of (meth)acrylate and the alicyclic hydrocarbon group-containing (meth)acrylate used may be, for example, 10% by weight or more and 95% by weight or less, 20% by weight or more and 95% by weight or less, 30% by weight or more and 90% by weight or less, 40% by weight or more and 90% by weight or less or 50% by weight or more and 85% by weight or less relative to all monomers used for preparing the polymer Ps.

Other examples of the monomer that may be included as a monomeric unit forming the polymer Ps in addition to the monomer S1 include aforementioned carboxyl group-containing monomers, acid anhydride group-containing monomers, hydroxy group-containing monomers, epoxy group-containing monomers, cyano group-containing monomers, isocyanato group-containing monomers, amido group-containing monomers, monomers having nitrogen atom-containing rings, monomers having succinimide skeletons, maleimides, itaconimides, aminoalkyl (meth)acrylates, vinyl esters, vinyl ethers, olefins, (meth)acrylic esters having aromatic hydrocarbon groups, heterocyclic ring-containing (meth)acrylates, halogen atom-containing (meth)acrylates, and (meth)acrylates obtained from terpene compound derivative alcohols, which are exemplified earlier as monomers that may be used for the acrylic polymer Pa.

Other examples of the monomer that may be included as a monomeric unit forming the polymer Ps in addition to the monomer S1 include oxyalkylene di(meth)acrylates such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate and tripropylene glycol di(meth)acrylate polymerizable polyoxyalkylene ethers which have, at one terminal of the polyoxyalkylene chain having a polyoxyalkylene skeleton such as polyethylene glycol and polypropylene glycol, a polymerizable functional group such as a (meth)acryloyl group, a vinyl group and an allyl and, at the other terminal, an ether structure (such as alkyl ether, aryl ether and aryl alkyl ether); alkoxyalkyl (meth)acrylates such as methoxyethyl (meth)acrylate, ethoxyethyl (meth)acrylate, propoxyethyl (meth)acrylate, butoxyethyl (meth)acrylate and ethoxypropyl (meth)acrylate; salts such as alkali metal (meth)acrylates; polyvalent (meth)acrylates such as trimethylolpropane tri(meth)acrylic ester; halogenated vinyl compounds such as vinylidene chloride and 2-chloroethyl (meth)acrylate; oxazoline group-containing monomers such as 2-vinyl-2-oxazoline, 2-vinyl-5-methyl-2-oxazoline and 2-isopropenyl-2-oxazoline; aziridine group-containing monomers such as (meth)acryloyl aziridine and 2-aziridinylethyl (meth)acrylate; hydroxy group-containing vinyl monomers such as 2-hydroxyethyl (meth)acrylate, 2-hydroxypropyl (meth)acylate and addicts of a lactone and 2-hydroxyethyl (meth)acrylate; fluorine-containing vinyl monomers such as fluorine-substituted (meth)acrylic acid alkyl esters; reactive halogen-containing vinyl monomers such as 2-chloroethyl vinyl ether and vinyl monochloroacetate; organic silicon-containing vinyl monomers such as vinyltrimethoxysilane, γ-(meth)acryloxypropyl trimethoxysilane, allyltrimethoxysilane, trimethoxysilylpropylallylamine and 2-methoxyethoxytrimethoxysilane; and macromonomers having a radical polymerizable vinyl group at a monomer terminal obtained by polymerization of vinyl groups. Among these, solely one species or a combination of two or more species can be copolymerized with the monomer S1.

The Mw of polymer Ps is not particularly limited. The polymer Ps's Mw can be, for instance, $0.7 \times 10^4$ or greater and less than $10 \times 10^4$. When the polymer Ps's Mw is less than $0.7 \times 10^4$, the adhesive strength rise may be insufficient. When the polymer Ps's Mw is $10 \times 10^4$ or greater, the initial adhesive strength may not be reduced sufficiently. When the polymer Ps's Mw is within this range, it is easy to adjust the compatibility and mobility within the PSA layer in suitable ranges and obtain a PSA sheet that combines initial low adhesion and in-use strong adhesion at a high level.

In some embodiments, the polymer Ps's Mw can be, for instance, $1 \times 10^4$ or greater, $1.2 \times 10^4$ or greater, $1.5 \times 10^4$ or greater, and $1.7 \times 10^4$ or greater. In some embodiments, the polymer Ps's Mw can be, for instance, less than $5 \times 10^4$, less than $4 \times 10^4$, or even less than $3 \times 10^4$.

The polymer Ps can be prepared by polymerizing the aforementioned monomers by a known method such as solution polymerization, emulsion polymerization, bulk polymerization, suspension polymerization and photopolymerization.

To adjust the molecular weight of the polymer Ps, a chain transfer agent can be used. Examples of the chain transfer agent used include mercapto group-containing compounds such as octyl mercaptan, lauryl mercaptan, t-nonyl mercaptan, t-dodecyl mercaptan, mercaptoethanol and α-thioglycerol; thioglycolic acid, and thioglycolic esters such as methyl thioglycolate, ethyl thioglycolate, propyl thioglycolate, butyl thioglycolate, t-butyl thioglycolate, 2-ethylhexyl thioglycolate, octyl thioglycolate, isooctyl thioglycolate, decyl thioglycolate, dodecyl thioglycolate, thioglycolic ester of ethylene glycol thioglycolic ester of neopentyl glycol and thioglycolic ester of pentaerythritol and α-methylstyrene dimer.

The amount of chain transfer agent used is not particularly limited. Relative to 100 parts by weight of monomers, it usually includes 0.05 part to 20 parts by weight of chain transfer agent, preferably 0.1 part to 15 parts by weight, or more preferably 0.2 part to 10 parts by weight. Such adjustment of the amount of chain transfer agent added can bring about a polymer Ps having a favorable molecular weight. For the chain transfer agent, solely one species or a combination of two or more species can be used.

While no particular limitations are imposed, the amount of polymer Ps used to 100 parts by weight of base polymer (e.g. acrylic polymer Pa) can be, for instance, 0.1 part by weight or more; from the standpoint of obtaining greater effect, it can be 0.3 part by weight or more, 0.4 part by weight or more, or even 0.5 part by weight or more. With increasing amount of polymer Ps used, greater effect tends to be obtained in reducing the initial adhesive strength or increasing the adhesive strength rise ratio, or in both of these. In some embodiments, the amount of polymer Ps used to 100 parts by weight of base polymer can be 1 part by weight or more, 2 parts by weight or more, or even 3 parts by weight or more. The art disclosed herein can be favorably implemented in an embodiment where the amount of polymer Ps used to 100 parts by weight of base polymer is more than 5 parts by weight, more than 10 parts by weight, more than 12 parts by weight, or more than 15 parts by weight. The amount of polymer Ps used to 100 parts by weight of base polymer can be, for instance, 75 parts by weight or less, 60 parts by weight or less, or even 50 parts by weight or less. From the standpoint of avoiding an excessive decrease in cohesive strength of the PSA layer, in some embodiments, the amount of polymer Ps used to 100 parts by weight of base polymer can be, for instance, 40 parts by weight or less, 35 parts by weight or less, 30 parts by weight or less, or even 25 parts by weight or less. From the standpoint of obtaining higher post-heat adhesive strength, in some embodiments, the amount of polymer Ps used can be 20 parts by weight or less, 17 pmts by weight or less, 15 parts by weight or less, or even 10 parts by weight or less. In some embodiments of the PSA sheet disclosed herein, the amount of polymer Ps used to 100 parts by weight of base polymer can be, for instance, less than 10 parts by weight, or even 8 parts by weight or less.

The siloxane structure-containing polymer Ps as described above may preferably work as adhesive strength rise retarder when included in the PSA layer. The PSA sheet disclosed herein can be preferably made in an embodiment where the PSA forming the PSA layer comprises a base polymer and an adhesive strength rise retarder, with the adhesive strength rise retarder comprising a polymer Ps. Here, the polymer Ps is thought to work as adhesive strength rise retarder for the following reasons; In the PSA sheet before applied and early after applied to an adherend, the polymer Ps present in the surface of the PSA layer reduces the initial adhesive strength; with aging or upon heating after applied, etc., the PSA flows to decrease the amount of polymer Ps present in the PSA layer surface, thereby increasing the adhesive strength. Thus, as the adhesive strength rise retarder in the art disclosed herein, other material(s) capable of providing the same kind of effect can be used in place of or in combination with the polymer Ps. Non-limiting examples of such materials include a polymer having a polyoxyalkylene structure in the molecule (or a "polymer Po" hereinafter). The polymer Po can be, for instance, a polymer including a monomeric unit derived from a monomer having a polyoxyalkylene skeleton. Specific examples possibly used can be homopolymer of a monomer species having a polyoxyalkylene skeleton as described above or copolymer of two or more such species; copolymer of one, two or more species of monomer having a polyoxyalkylene skeleton and other monomer(s) (e.g. (meth)acrylic monomer); or the like. The amount of polyoxyalkylene skeleton-containing monomer used is not particularly limited. For instance, the amount of monomer S1 used in the polymer Ps can also be applied to the amount of polyoxyalkylene skeleton-containing monomer used. The amount of polymer Po used in the PSA layer is not particularly limited. For instance, the amount of polymer Ps used relative to the base polymer can also be applied to the amount of polymer Po used relative to the base polymer. Alternatively, the polymer Po may be substituted for part (e.g. about 5% to 95% by weight, about 15% to 85% by weight, or about 30% to 70% by weight of the total amount of polymer Ps used) of the aforementioned amount of polymer Ps used relative to the base polymer.

(Crosslinking Agent)

In the PSA layer, for purposes such as adjusting the cohesive strength, a crosslinking agent may be used as necessary. As the crosslinking agent, a crosslinking agent known in the PSA field can be used, with examples including epoxy-based crosslinking agents, isocyanate-based crosslinking agent, silicone-based crosslinking agent, oxazoline-based crosslinking agent, aziridine-based crosslinking agent, silane-based crosslinking agent, alkyl-etherified melamine-based crosslinking agent and metal chelate-based crosslinking agents. In particular, isocyanate-based crosslinking agents, epoxy-based crosslinking agents and metal chelate-based crosslinking agents can be favorably used. For the crosslinking agent, solely one species or a combination of two or more species can be used.

Specific examples of the isocyanate crosslinking agent include tolylene diisocyanate, hexamethylene diisocyanate, isophorone diisocyanate, xylylene diisocyanate, hydrogenated xylylene diisocyanate, diphenyl(meth)ane diisocyanate, hydrogenated diphenyl(meth)ane diisocyanate, tetramethylxylylene diisocyanate, naphthalene diisocyanate, triphenyl(meth)ane triisocyanate, polymethylene polyphenyl isocyanate and adducts of the foregoing with a polyol such as trimethylolpropane. Alternatively, as the isocyanate crosslinking agent, it is possible to use a compound having at least one isocyanato group and one or more unsaturated bonds per molecule, namely, 2-isocyanatoethyl (meth)acrylate and the like. Among these, solely one species or a combination of two or more species can be used.

Examples of the epoxy crosslinking agent include bisphenol A, epichlorhydrin-based epoxy resins, ethylene glycidyl ether, polyethylene glycol diglycidyl ether, glycerine diglycidyl ether, glycerine triglycidyl ether, 1,6-hexanediol glycidyl ether, trimethylolpropane triglycidyl ether, diglycidyl aniline, diamine glycidyl amine. N,N,N',N'-tetraglycidyl-m-xylylene diamine and 1,3-bis(N,N-diglycidylaminomethyl)cyclohexane. Among these, solely one species or a combination of two or more species can be used.

Examples of the metal chelate compound include those containing a metal component such as aluminum, iron, tin, titanium and nickel and a chelate component such as acetylene, methyl acetoacetate and ethyl lactate. Among these, solely one species or a combination of two or more species can be used.

When using a crosslinking agent, its amount used is not particularly limited. For instance, its amount can be greater than 0 part by weight relative to 100 parts by weight of base polymer. The amount of crosslinking agent used to 100 parts by weight of base polymer can be, for instance, 0.01 part by weight or greater, or preferably 0.05 part by weight or greater. With increasing amount of crosslinking agent used, greater cohesive strength tends to be obtained. In some embodiments, the amount of crosslinking agent used to 100 parts by weight of base polymer can be 0.1 part by weight or greater, 0.5 part by weight or greater, or even 1 part by weight or greater. On the other hand, from the standpoint of avoiding a decrease in tack caused by an excessive increase in cohesive strength, the amount of crosslinking agent used to 100 parts by weight of base polymer is usually suitably 15 parts by weight or less, 10 parts by weight or less, or even 5 parts by weight or less. In the PSA having a composition that includes a siloxane structure-containing polymer Ps or other adhesive strength rise retarder, it may also be advantageous that the crosslinking agent is not used far in excess from the standpoint of taking advantage of the fluidity of PSA to better benefit from the use of adhesive strength rise retarder. The art disclosed herein can also be favorably implemented in an embodiment using no crosslinking agent.

In some embodiments, at least an isocyanate-based crosslinking agent can be used as the crosslinking agent. From the standpoint of obtaining a PSA sheet with a high post-heat cohesive strength and a large adhesive strength rise ratio, in some embodiments, the amount of isocyanate-based crosslinking agent used to 100 parts by weight of base polymer can be, for instance, 5 parts by weight or less, 3 parts by weight or less, less than 1 part by weight, 0.7 part by weight or less, or even 0.5 part by weight or less.

While no particular limitations are imposed, in case of using an isocyanate-based crosslinking agent in an embodiment where the PSA layer includes a hydroxy group-containing monomer as a monomeric unit, relative to the amount $W_{NCO}$ of isocyanate-based crosslinking agent used, the hydroxy group-containing monomer can be used in an amount $W_{OH}$ so that $W_{OH}/W_{NCO}$ is equal to or greater than 2 by weight. With the hydroxy group-containing monomer used in a greater amount relative to the isocyanate-based crosslinking agent, structures of crosslinks suited for increasing the adhesive strength rise ratio can be formed. In some embodiments, $W_{OH}/W_{NCO}$ can be 3 or greater, 5 or greater, 10 or greater, 20 or greater, 30 or greater, or even 50 or greater. The maximum $W_{OH}/W_{NCO}$ ratio value is not particularly limited. $W_{OH}/W_{NCO}$ can have a value of, for instance, 500 or less, 200 or less, or even 100 or less.

To allow an aforementioned crosslinking reaction to proceed effectively, a crosslinking catalyst may be used. As the crosslinking catalyst, for instance, a tin-based catalyst (especially, dioctyltin dilaurate) can be preferably used. The amount of crosslinking catalyst used is not particularly limited. For instance, it can be about 0.0001 part to 1 part by weight to 100 parts by weight of base polymer.

In the PSA layer, a polyfunctional monomer may be used as necessary. The polyfunctional monomer used in place of or in combination with a crosslinking agent as described above may be helpful for purposes such as adjusting the cohesive strength. For instance, in the PSA layer formed from a photo-curable PSA composition, a polyfunctional monomer can be preferably used.

Examples of the polyfunctional monomer include ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, pentaerythritol tri(meth)acrylate, dipentaerthyritol hexa(meth)acrylate, ethyleneglycol di(meth)acrylate, 1,6-hexanediol di(meth)acrylate, 1,12-dodecanediol di(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, butyldiol (meth)acrylate and hexyldiol di(meth)acrylate. Among them, trimethylolpropane tri(meth)acrylate, 1,6-hexanediol di(meth)acrylate and dipentaerythritol hexa(meth)acrylate can be favorably used. For the polyfunctional monomer, solely one species or a combination of two or more species can be used.

The amount of polyfunctional monomer used depends on its molecular weight, the number of functional groups therein, etc.; it is usually suitably in a range of about 0.01 part to 3 parts by weight to 100 parts by weight of base polymer. In some embodiments, the amount of polyfunctional monomer used to 100 parts by weight of base polymer can be, for instance, 0.02 part by weight or greater, or even 0.03 part by weight or greater. With increasing amount of polyfunctional monomer used, a higher cohesive strength tends to be obtained. On the other hand, from the standpoint of avoiding a decrease in tack caused by an excessive increase in cohesive strength, the amount of polyfunctional monomer used to 100 parts by weight of base polymer can be 2.0 parts by weight or less, 1.0 part by weight or less, or even 0.5 part by weight or less. In the PSA having a composition that includes a siloxane structure-containing polymer Ps or other adhesive strength rise retarder, it may also be advantageous that the polyfunctional monomer is not used far in excess from the standpoint of taking advantage of the fluidity of PSA to better benefit from the use of adhesive strength rise retarder.

(Tackifier Resin)

The PSA layer may include a tackifier resin as necessary. The tackifier resin is not particularly limited Examples include a rosin-based tackifier resin, a terpene-based tackifier resin, a phenol-based tackifier resin, a hydrocarbon-based tackifier resin, a ketone-based tackifier resin, a polyamide-based tackifier resin, an epoxy-based tackifier resin, and an elastomer-based tackifier resin. For the tackifier resin, solely one species or a combination of two or more species can be used.

Examples of the rosin-based tackifier resin include unmodified rosins (raw rosins) such as gum rosin, wood rosin and tall oil rosin, modified rosins (polymerized rosins, stabilized rosins, disproportionated rosins, fully hydrogenated rosins, partially hydrogenated rosins and other chemically modified rosins) obtained by modifying unmodified rosins by polymerization, disproportionation, hydrogenation and various rosin derivatives.

Examples of the rosin derivative include rosin-phenol-based resins obtainable by acid-catalyzed addition of phenol to rosins (unmodified rosins, modified rosins, various rosin derivatives, etc.) followed by thermal polymerization;

rosin ester-based resins such as esterified rosins (unmodified rosin esters) obtainable by esterification of unmodified rosins with alcohols and esterified modified rosins (polymerized rosin esters, stabilized rosin esters, disproportionated rosin esters fully hydrogenated rosin esters, partially hydrogenated rosin esters, etc.) obtainable by esterification of modified rosins such as polymerized rosins, stabilized rosins, disproportionated rosins, fully hydrogenated rosins and partially hydrogenated rosins with alcohols:

unsaturated fatty acid-modified rosin-based resins obtainable by modifying unmodified rosins or modified rosins (polymerized rosins, stabilized rosins, disproportionated rosins, fully hydrogenated rosins, partially hydrogenated rosin, etc.) with unsaturated fatty acids;

unsaturated fatty acid-modified rosin ester-based resins obtainable by modifying rosin ester resins with unsaturated fatty acids;

rosin alcohol resins obtainable by reducing carboxyl groups in unmodified rosins, modified rosins (such as polymerized rosins, stabilized rosins, disproportionated rosins, fully hydrogenated rosins, partially hydrogenated rosins, etc.), unsaturated fatty acid-modified rosin-based resins or unsaturated fatty acid-modified rosin ester-based resins; and metal salts of rosin resins (particularly rosin ester-based resins) such as unmodified rosins, modified rosins and various rosin derivatives.

Examples of the terpene-based tackifier resin include terpene-based resins such as α-pinene polymers. β-pinene polymers and dipentene polymers, modified terpene-based resins (terpene phenol-based resins, styrene modified terpene-based resins, aromatic modified terpene-based resins and hydrogenated terpene-based resins, etc.) obtainable by modification (phenol modification, aromatic modification, hydrogenation, hydrocarbon modification) of terpene resins and the like.

Examples of the phenol-based tackifier resin include condensation products (alkylphenol-based resins, xylene formaldehyde-based resins, etc.) between various phenols (phenol, m-cresol, 3,5-xylenol p-alkylphenols, resorcin, etc.) and formaldehyde, resol obtainable by base-catalyzed addition of the phenols and formaldehyde, and novolac obtainable by acid-catalyzed condensation of the phenols and formaldehyde.

Examples of the hydrocarbon-based tackifier resin include various hydrocarbon resins such as aliphatic hydrocarbon resins, aromatic hydrocarbon resins, alicyclic hydrocarbon resins, aliphatic/aromatic petroleum resins (styrene-olefin-based copolymers, etc.), aliphatic/alicyclic petroleum resins, hydrogenated hydrocarbon resins, coumarone-based resins and coumarone-indene-based resins.

Examples of commercially available polymerized rosin esters that can be preferably used include, but are not limited to, product names PENSEL D-125, PENSEL D-135, PENSEL D-160, PENSEL KK, PENSEL C available from Arakawa Chemical Industries, Ltd.

Examples of commercially available terpene phenol resins that can be preferably used include, but are not limited to, product names YS POLYSTER S-145, YS POLYSTER G-125, YS POLYSTER N125 and YS POLYSTER U-115 available from Yasuhara Chemical Co., Ltd.; product names TAMANOL 803L and TAMANOL 901 available from Arakawa Chemical Industries. Ltd.; and product name SUMILITE RESIN PR-12603 available from Sumitomo Bakelite Co., Ltd.

When using a tackifier resin, its amount included is not particularly limited and can be selected so that suitable adhesive properties are obtained in accordance with the purpose and application. The tackifier resin content (when two or more species of tackifier resins are included, their combined amount) to 100 parts by weight of base polymer can be greater than 0 part by weight; it can be, for instance, about 5 parts to 500 parts by weight. Alternatively, a tackifier resin may not be used.

A preferable tackifier resin has a softening point (softening temperature) of about 80° C. or higher (preferably about 100° C. or higher, e.g. about 120° C. or higher). According to a tackifier resin having a softening point at or above these lower limits, the initial low adhesion and in-use strong adhesion tend to be effectively improved. The maximum softening point is not particularly limited; it can be, for instance, about 200° C. or lower (typically 180° C. or lower). The softening point of a tackifier resin can be determined based on the softening point test method (ring and ball method) specified in JIS K 2207.

(Thermally Conductive Filler)

The thermally conductive filler (or abbreviated to a "filler" hereinafter) is not particularly limited, a filler capable of enhancing heat transfer of the PSA sheet when included in the PSA layer can be used. For instance, a particulate or fibrous filler can be used. For the filler, solely one species or a combination of two or more species can be used.

The material forming the filler can be an inorganic material, with examples including metals such as copper, silver, gold, platinum, nickel, aluminum, chromium, iron, and stainless steel; metal oxides such as aluminum oxide, silicon oxides (typically silicon dioxide), titanium oxide, zirconium oxide, zinc oxide, tin oxide, antimonic acid-doped tin oxide, copper oxide, and nickel oxide; hydrated metal compounds such as aluminum hydroxide [$Al_2O_3.3H_2O$ or $Al(OH)_3$], boehmite [$Al_2O_3.H_2O$ or $AlOOH$], magnesium hydroxide [$MgO.H_2O$ or $Mg(OH)_2$], calcium hydroxide [$CaO.H_2O$ or $Ca(OH)_2$], zinc hydroxide [$Zn(OH)_2$], silica [$H_4SiO_4$ or $H_2SiO_3$ or $H_2Si_2O_5$], iron hydroxide [$Fe_2O_3.H_2O$ or $2FeO(OH)$], copper hydroxide [$Cu(OH)_2$], barium hydroxide [$BaO.H_2O$ or $BaO.9H_2O$], hydrated zirconium oxide [$ZrO.nH_2O$], hydrated tin oxide [$SnO.H_2O$], basic magnesium carbonate [$3MgCO_3.Mg(OH)_2.3H_2O$], hydrotalcite [$6MgO.Al_2O_3.H_2O$]dawsonite [$Na_2CO_3.Al_2O_3.nH_2O$], borax [$Na_2O.B_2O_5.5H_2O$] and zinc borate [$2ZnO.3B_2O_5.3.5H_2O$]; carbides such as silicon carbide, boron carbide, nitrogen carbide, and calcium carbide; nitrides such as aluminum nitride, silicon nitride, boron nitride, and gallium nitride; carbonates such as calcium carbonate; titanates including barium titanate and potassium titanate; carbon-based substances including carbon black, carbon tubes (typically carbon nanotubes), carbon fibers, and diamond; and glass. Alternatively, particulate natural raw materials can also be used, such as volcanic shirasu (ash), clay and sand. As the fibrous filler, various synthetic fibers and natural fibers can be used. In typical a particulate filler is preferably used because it is less likely to impair the smoothness of the adhesive face even if it is included in the PSA layer in a relatively large amount. The particle shape is not particularly limited; it may have a bulky shape, a needle-like shape, a flaky shape, or a layered shape. Examples of the bulky shape include a globular shape, a cuboid shape, a granular shape and deformed shapes of these.

In some embodiments, fillers formed of aforementioned hydrated metal compounds can be preferably used. The hydrated metal compounds generally start to decompose at temperatures between 150° C., and 500° C., they are compounds represented by the general formula $MxOy.nH_2O$ (M is a metal atom, x and y are integers of 1 or greater determined by the valence of the metal, and n is the number of waters of hydration) or double salts containing these compounds. A favorable example of the hydrated metal compound is aluminum hydroxide.

Hydrated metal compounds are commercially available. Examples of commercially available aluminum hydroxides include product names HIGILITE H-100-ME (mean primary particle diameter: 75 µm). HIGILITE H-10 (mean primary particle diameter: 55 µm), HIGILITE H-32 (mean primary particle diameter: 8 µm), HIGILITE H-31 (mean primary particle diameter: 20 µm) and HIGILITE H-42 (mean primary particle diameter: 1 µm) (all available from Showa Denko K.K.); and product name B103ST (mean primary particle diameter: 8 µm) (available from Nippon Light Metal Co., Ltd.). Examples of commercially available magnesium hydroxide include product name KISUMA 5A (mean primary particle diameter: 1 µm) (available from Kyowa Chemical Industry Co., Ltd.).

Examples of commercially available fillers other than hydrated metal compounds include boron nitride under product names HP-40 (available from Mizushima Ferroallov Co., Ltd.) and PT620 (available from Momentive Performance Materials Inc.); aluminum oxide under product names AS-50 and AS-10 (available from Showa Denko KK); antimonic acid-doped tin under product names SN-1 (XS, SN-100P and SN-100D (an aqueous dispersion) (all available from Ishihara Sangyo Kaisha, Ltd.); titanium oxide products under the TTO series (available from Ishihara Sangyo Kaisha, Ltd.); and zinc oxide under product names ZnO-310, ZnO-350 and ZnO-410 (available from Sumitomo Osaka Cement Co., Ltd.).

The filler content in the PSA layer is not particularly limited and can be selected in accordance with the desired thermal resistance, etc. Of the PSA layer, the filler content can be, for instance, 5% by weight or more, 10% by weight or more, 25% by weight or more, 33% by weight or more, 40% by weight or more, or even 50% by weight or more. With increasing filler content, the thermal resistance tends to decrease. In some embodiments, the filler content can be 55% by weight or more of the PSA layer, 60% by weight or more, or even 65% by weight or more. From the standpoint of preventing deterioration of surface smoothness of the PSA layer so that tight adhesion is likely to be achieved with the adherend, the filler content is usually suitably 90% by weight or less, preferably 80% by weight or less, or possibly 75% by weight or less, or even 70% by weight or less.

The mean particle diameter of filler is not particularly limited. The mean particle diameter is usually suitably 100 µm or less, preferably 50 µm or less, or possibly even 20 µm or less. With decreasing mean particle diameter, the PSA layer tends to have a smoother surface and adhere tightly to adherends. In some embodiments, the filler may have a mean particle diameter of 10 µm or less, 5 µm or less, or even 3 µm or less. The filler's mean particle diameter can be, for instance, 0.1 µm or greater, 0.2 µm or greater, or even 0.5 µm or greater. It can be advantageous to have not too small a mean particle diameter from the standpoint of the ease of handling and dispersing the filler.

In some embodiments, relative to the thickness Ta of the PSA layer containing the filler, the filler's mean particle diameter is preferably less than 0.5 Ta. Here, in this description, unless otherwise informed, the filler's mean particle diameter refers to the 50th-percentile particle diameter (median diameter) corresponding to 50% cumulative weight in a given size distribution obtained by a screening analysis. When the filler's mean particle diameter is less than 50% of the PSA layer's thickness Ta, it can be said that 50% by weight or more of the filler in the PSA layer have particle diameters smaller than the PSA layer's thickness Ta. When 50% by weight or more of the filler in the PSA layer have particle diameters smaller than the PSA layer's thickness Ta, there is a higher tendency for the surface (adhesive face) of the PSA layer to maintain good surface conditions (e.g. smoothness). This is preferable from the standpoint of obtaining tighter adhesion with the adherend to increase the thermal conductivity and post-heat adhesive strength. In addition, the appearance of the PSA layer surface can be maintained well.

The PSA sheet disclosed herein can be preferably made in an embodiment where, in the particle distribution obtained by the scanning analysis, 60% by weight or more of the filler m the PSA layer have particle diameters smaller than the PSA layer's thickness Ta (more preferably than 0.7 Ta, or yet more preferably than 0.5 Ta). Of the filler, the ratio of particles having particle diameters smaller than the PSA layer's thickness Ta (more preferably than 0.7 Ta, or yet more preferably than 0.5 Ta) can be, for instance, 70% by weight or more, 80% by weight or more, or even 90% by weight or more. It is more preferable that substantially all of the filler m the PSA layer have particle diameters smaller than the PSA layer's thickness Ta (more preferably than 0.7 Ta, or yet more preferably than 0.5 Ta). Here, "substantially all" typically means 99% by weight or more and 100% by weight or less, for instance, 99.5% by weight or more and 100% by weight or less.

In some embodiments of the PSA sheet disclosed herein, the PSA layer may comprise, as the filler, a first filler having a first size distribution and a second filler having a second size distribution. In the first filler's size distribution (first size distribution), the fast filler has a mean primary particle diameter (by volume) of preferably less than 10 µm, more preferably 5 µm or less, or yet more preferably 2 µm or less. The mean primary particle diameter (by volume) of the first filler may be, for instance, 0.1 µm or greater. In the second filler's size distribution (second size distribution), the second filler has a mean primary particle diameter (by volume) of preferably 10 µm or greater, more preferably 20 pin or greater, or yet more preferably 30 µm or greater. The mean primary particle diameter (by volume) of the second filler may be, for instance, 100 µm or less. Here, the size distributions are determined by laser scattering particle size distribution analysis. In particular, they are determined by a laser scattering size meter. The mean primary particle diameter by volume is determined as a D50 (50th-percentile or median diameter) value based on the size distribution data.

In an embodiment using the first and second fillers as the filler, the weight ratio of the first filer to the second filler in the PSA layer (first filler/second filler) can be, for instance, 10/(90 to 80/20, 20/80 to 70/30, or even 30/70 to 60/40.

(Dispersing Agent)

The PSA composition for forming PSA layers may comprise, as necessary, a dispersing agent to well disperse the filler in the PSA composition. The PSA composition with a well dispersed filler can form a PSA layer with good adhesive properties.

As the dispersing agent, a known surfactant can be used. The surfactant encompasses nonionic, anionic, cationic and amphoteric surfactants. For the dispersing agent, solely one species or a combination of two or more species can be used.

One example of preferable dispersing agent is a phosphoric acid ester. For instance, a monoester, diester, triester of phosphoric acid, a mixture of these and the like can be used. Specific examples of the phosphoric acid ester include phosphoric acid monoesters of polyoxyethylene alkyl ether, polyoxyethylene alkyl aryl ether or polyoxyethylene aryl ether, the corresponding phosphoric acid diesters, the corresponding phosphoric acid triesters, and derivatives of these. Favorable examples include phosphoric acid monoesters of polyoxyethylene alkyl ether or polyoxyethylene alkyl aryl ether, and phosphoric acid diesters of polyoxyethylene alkyl ether or polyoxyethylene alkyl aryl ether. The number of carbon atoms of the alkyl group in such a phosphoric acid ester is, for instance, 6 to 20, preferably 8 to 20, or more preferably 10 to 18, typically 12 to 16.

As the phosphoric acid ester, a commercially available product can be used. Examples include trade names PLYSURF A212E, PLYSURF A210G, PLYSURF A212C and PLYSURF A215C available from DKS Co., Ltd., and trade names PHOSPHANOL RE610, PHOSPHANOL RS710 and PHOSPHANOL RS610 available from TOHO Chemical industry Co., Ltd.

The amount of dispersing agent used to 100 parts by weight of filler can be, for instance, 0.01 part to 25 parts by weight; it is usually suitably 0.1 part to 25 parts by weight. From the standpoint of preventing troubled application of the PSA composition and roughening of the adhesive face caused by poor dispersion of the filler, the amount of dispersing agent used to 100 parts by weight of filler is preferably 0.5 part by weight or greater, more preferably 1 part by weight or greater, yet more preferably 2 parts by weight or greater, or even 5 parts by weight or greater. From the standpoint of avoiding deterioration of adhesive properties caused by an excessive use of dispersing agent, the amount of dispersing agent used to 100 parts by weight of filler is preferably 20 parts by weight or less, more preferably 15 parts by weight or less, possibly 12 parts by weight or less, or even 10 parts by weight or less.

Besides the above, as far as the effect of this invention is not significantly impaired, the PSA layer in the art disclosed herein may include, as necessary, known additives that can be used in PSA, such as leveling agent, plasticizer, softener, colorant (dye, pigment, etc.), antistatic agent, anti-aging agent UV absorber, antioxidant, photo stabilizer, and preservative.

<PSA Sheet>

The PSA layer forming the PSA sheet disclosed herein may be a cured layer of the PSA composition. In other words, it can be formed by providing (e.g. applying) the PSA composition to a suitable surface and then subjecting it to a suitable curing process. When two or more different curing processes (drying, crosslinking polymerization, etc.) are carried out, these can be done at the same time or in stages. When a partial polymer (acrylic polymer syrup) of monomers are used for the PSA composition, a final copolymerization reaction is typically carried out as the curing process. That is, the partial polymer is subjected to a further copolymerization reaction to form a fully polymerized product. For instance, with respect to a photocurable PSA composition, photoirradiation is carried out. As necessary, curing processes such as crosslinking and drying can be performed. For instance, with respect to a photocurable PSA composition that needs to be dried, photocuring should be carried out after drying. With respect to a PSA composition using a fully polymerized product, processes such as drying (drying with heat) and crosslinking are typically carried out as necessary as the curing process.

The PSA composition can be applied with, for example, a conventional coater such as a gravure roll coater, a reverse roll coater, a kiss-roll coater, a dip roll coater, a bar coater, a knife coater and a spray coater.

In the PSA sheet having a substrate, the PSA layer may be provided to the surface of the substrate by a direct method in which the PSA composition is directly provided to the substrate to form a PSA layer, by a transfer method in which a PSA layer formed on a releasable surface (release face) is transferred onto the substrate, or by combination of these methods. As for the release surface, for instance, a surface of a release liner, and a substrate's backside treated with a release agent may be used.

The thickness of the PSA layer is not particularly limited. For instance, it can be 3 μm or greater, 5 μm or greater, or 10 μm or greater. From the standpoint of readily obtaining the effect of using the thermally conductive filler to increase the post-heat adhesive strength, the PSA layer's thickness can be, for instance, 20 μm or greater, 35 μm or greater, 50 μm or greater, or even greater than 50 μm. From the standpoint of obtaining greater fixing ability, in some embodiments, the PSA layer's thickness can be, for instance, 55 μm or greater, 65 μm or grater, 80 μm or greater, or even 90 μm or greater. To lower the thermal resistance of the PSA sheet, the thinner the PSA layer is, the more advantageous it is. From such a standpoint, the PSA layer's thickness is usually suitably 1000 μm or less, preferably 700 μm or less, 500 μm or less, 400 μm or less, or even 350 μm or less. In some embodiments, the PSA layer's thickness can also be 300 μm or less, 200 μm or less, or even 150 μm or less. In a substrate-free PSA sheet formed of a PSA layer, the PSA layer's thickness is equal to the PSA sheet's thickness. In case of a double-faced PSA sheet having a PSA layer on each face of a substrate, the aforementioned PSA layer's thickness is per face of substrate.

<Support Substrate>

The thermally conductive PSA sheet according to some embodiments may be in a form of substrate-supported PSA sheet having a PSA layer on one or each of a support substrate. The material of support substrate is not particularly limited and can be suitably selected in accordance with the purpose and application of the PSA sheet Non-limiting examples of the substrate that may be used include plastic films including a polyolefin film whose primary component is a polyolefin such as polypropylene and ethylene-propylene copolymer, a polyester film whose primary component is polyester such as polyethylene terephthalate and polybutylene terephthalate, and a polyvinyl chloride film whose primary component is polyvinyl chloride; a foam sheet formed of a foam such as polyurethane foam, polyethylene foam and polychloroprene foam; woven and nonwoven fabrics of single or blended spinning of various fibrous materials (which may be natural fibers such as hemp and cotton, synthetic fibers such as polyester and vinylon, semi-synthetic fibers such as acetate, etc.); paper such as Japanese paper, high-quality paper, kraft paper and crepe paper, and metal foil such as aluminum foil and copper foil. The substrate may be a composite of these materials. Examples of the composite substrate include a substrate having a layered structure of metal foil and plastic film, and a plastic substrate reinforced with inorganic fibers such as glass cloth.

As the substrate of the PSA sheet disclosed herein, various film substrates can be preferably used. The film substrate can be a porous substrate such as a foam film and a non-woven fabric sheet, a non-porous substrate, or a substrate having a layered structure of porous and non-porous layers. In some embodiment, a preferable film substrate comprises a resin film capable of independently holding its shape (standing by itself or independently) as the base film. The "resin film" here means a resin film that typically has a non-porous structure and is substantially free of air bubbles (void-less). Thus, the concept of resin film is distinct from foam films and non-woven fabrics. The resin film may have a mono-layer structure or a multilayer structure with two or more layers (e.g. a three-layer structure).

Examples of the resin material forming the resin film include resins including polyester, polyolefin, polyamide (PA) such as nylon 6, nylon 66 and partially aromatic polyamide, polyimide (PI), polyamide-imide (PAI), polyether ether ketone (PEEK), polyether sulfone (PES), polyphenylene sulfide (PPS), polycarbonate (PC), polyurethane (PU), ethylene-vinyl acetate copolymers (EVA), fluororesins such as polytetrafluoroethylene (PTFE), acrylic resins, polyacrylate, polystyrene, polyvinyl chloride, and polyvinylidene chloride. The resin film may be formed from a resin material containing one species of such resin alone or a resin material in which two or more species are blended. The resin film may be non-stretched or stretched (e.g. uniaxially stretched or biaxially stretched).

Favorable examples of the resin material forming the resin film include polyester resins, PPS resins and polyolefin resins. Here, the polyester resin refers to a resin containing more than 50% polyester by weight. Similarly, the PPS resin refers to a resin containing more than 50% PPS by weight and the polyolefin resin refers to a resin containing more than 50% polyolefin by weight.

As the polyester resin, it is typical to use a polyester-based resin whose primary component is a polyester obtainable by polycondensation of a dicarboxylic acid and a diol.

Examples of the dicarboxylic acid forming the polyester include aromatic dicarboxylic acids such as phthalic acid, isophthalic acid, terephthalic acid, 2-methylterephthalic acid, 5-sulphoisophthalic acid, 4,4'-diphenyl-dicarboxylic acid, 4,4'-diphenyl ether dicarboxylic acid, 4,4'-diphenyl ketone dicarboxylic acid, 4,4'-diphenoxyethane dicarboxylic acid, 4,4'-diphenylsulphone dicarboxylic acid, 1,4-naphthalenedicarboxylic acid, 1,5-naphthalenedicarboxylic acid, 2,6-naphthalenedicarboxylic acid and 2,7-naphthalenedicarboxylic acid; alicyclic dicarboxylic acids such as 1,2-cyclohexanedicarboxylic acid, 1,3-cyclohexanedicarboxylic acid and 1,4-cyclohexanedicarboxylic acid; aliphatic dicarboxylic acids such as malonic acid, succinic acid, glutaric acid, adipic acid, pimelic acid, suberic acid, azelaic acid, sebacic acid and dodecanoic acid; unsaturated dicarboxylic acids such as maleic acid, maleic anhydride and fumaric acid; and derivatives thereof (e.g. lower alkyl esters of the dicarboxylic acids such as terephthalic acid). Among these, solely one species or a combination of two or more species can be used. In view of the strength, etc., an aromatic dicarboxylic acid is preferable. Particularly preferable dicarboxylic acids include terephthalic acid and 2,6-naphthalenedicarboxylic acid. For example, 50% by weight or more (e.g. 80% by weight or more, typically 95% by weight or more) of the dicarboxylic acid forming the polyester is accounted for by terephthalic acid, 2,6-naphthalenedicarboxylic acid or the two together. The dicarboxylic acid may essentially consist of terephthalic acid, essentially consist of 2,6-naphthalenedicarboxylic acid, or essentially consist of terephthalic acid and 2,6-naphthalenedicarboxylic acid.

Examples of the diol forming the polyester include aliphatic diols such as ethylene glycol, diethylene glycol, polyethylene glycol, propylene glycol, polypropylene glycol 1,3-propanediol 1,5-pentanediol, neopentyl glycol, 1,4-butanediol, 1,6-hexanediol, 1,8-octanediol and polyoxytetramethylene glycol; alicyclic diols such as 1,2-cyclohexanediol, 1,4-cyclohexanediol, 1,1-cyclohexanedimethylol and 1,4-cyclohexanedimethylol; aromatic diols such as xylylene glycol, 4,4'-dihydroxybiphenyl, 2,2-bis(4'-hydroxyphenyl) propene and bis(4-hydroxyphenyl)sulfone; and the like. Among these, solely one species or a combination of two or more species can be used. In view of the transparency, etc., aliphatic diols are preferable and ethylene glycol is particularly preferable. The ratio of the aliphatic diol (preferably ethylene glycol) in the diol forming the polyester is preferably 50% by weight or higher (e.g. 80% by weight or higher, typically 95% by weight or higher). The diol may essentially consist of ethylene glycol.

Specific examples of the polyester resin include polyethylene terephthalate (PET), polybutylene terephthalate (PBT), polyethylene naphthalate (PEN), and polybutylene naphthalate.

As the polyolefin resin, solely one species of polyolefin or a combination of two or more species of polyolefin can be used. Examples of the polyolefin include an α-olefin homopolymer, a copolymer of two or more species of α-olefin, and a copolymer of one, two or more species of α-olefin and another vinyl monomer. Specific examples include polyethylene (PE), polypropylene (PP), poly-1-butene, poly-4-methyl-1-pentene, ethylene-propylene copolymers such as ethylene-propylene rubber (EPR), ethylene-propylene-butene copolymers, ethylene-butene copolymers, ethylene-vinyl alcohol copolymers and ethylene-ethyl acrylate copolymers. Either a low-density (LD) polyolefin or a high-density (HD) polyolefin can be used. Examples of the polyolefin resin include non-stretched polypropylene (CPP) film, biaxially-stretched polypropylene (OPP) film, low-density polyethylene (LDPE) film, linear low-density polyethylene (LLDPE) film, medium-density polyethylene (MDPE) film, high-density polyethylene (HDPE) film, polyethylene (PE) film in which two or more species of polyethylene (PE) are blended, PP/PE blend film in which polypropylene (PP) and polyethylene (PE) are blended.

Specific examples of the resin film that may be preferably used for the substrate of the PSA sheet disclosed herein include PET film, PEN film. PPS film, PEEK film. CPP film and OPP film.

Preferable examples in view of the strength include PET film, PEN film, PPS film and PEEK film. In terms of availability of the substrate. PET film and PPS film are particularly preferable. In particular, PET film is preferable.

As long as the effect of this invention is not significantly impaired, the resin film may include, as necessary, known additives such as photo stabilizer, antioxidant, antistatic agent colorant (dye, pigment, etc.), fillers, slip agent and anti-blocking agent. The amount of an additive is not particularly limited and can be suitably selected according to the application of the PSA sheet, etc.

The method for producing the resin film is not particularly limited. For instance, heretofore known general resin film formation methods can be suitably employed, such as extrusion molding, inflation molding, T-die casting and calendar rolling.

The substrate may be substantially formed from such a base film. Alternatively, the substrate may include a secondary layer in addition to the base film. Examples of the secondary layer include a layer for adjusting optical properties (such as a colored layer and an antireflection layer), a print layer and laminate layer to provide a desirable appearance to the substrate, a treated surface layer such as an antistatic layer, a primer layer, and a release layer.

The first face of the substrate may be subjected as necessary to a heretofore known surface treatment such as corona discharge treatment, plasma treatment, UV irradiation, acid treatment, alkali treatment, primer coating, and antistatic treatment. These surface treatments may increase the tightness of adhesion between the substrate and the PSA layer, that is, the anchoring of the PSA layer to the substrate. The composition of the primer is not particularly limited and can be suitably selected among known species. The thickness of the primer layer is not particularly limited and is usually suitably about 0.01 µm to 1 µm, or preferably about 0.1 µm to 1 µm.

In case of a single-faced PSA sheet, the second face of the substrate may be subjected as necessary to a heretofore known surface treatment such as release treatment and antistatic treatment. For instance, by treating the backside surface of the substrate with a release agent (typically, by providing a release layer formed of a release agent), the unwinding force of the PSA sheet in a rolled form can be reduced. As the release agent, it is possible to use a silicone-based release agent, long-chain alkyl release agent olefinic release agent fluorine-based release agent aliphatic amide-based release agent and molybdenum sulfide, silica powder and the like. For purposes of facilitating printing, reducing light reflection, facilitating layering application, etc., the second face of the substrate may be subjected to a treatment such as corona discharge treatment, plasma treatment, UV irradiation, acid treatment, and base treatment. In case of a double-faced PSA sheet, the second face of the substrate may be subjected to the same surface treatments as the examples of the surface treatment possibly provided to the first face of the substrate. The surface treatments provided to the first and second faces of the substrate may be the same or different.

The thickness of the substrate constituting the PSA sheet disclosed herein is not particularly limited and can be suitably selected in accordance with the purpose and application of the PSA sheet. From the standpoint of reducing the thermal resistance, the thinner the substrate is, the more advantageous it is. The substrate's thickness is usually suitably, for instance, 100 µm or less; it can be 50 µm or less, 25 µm or less, 10 µm or less, or even 5 µm or less. From the standpoint of the ease of handling, processing and so on, in some embodiments, the substrate's thickness can be, for instance, 2 µm or greater, greater than 5 µm, or even greater than 10 µm.

<PSA Sheet with Release Liner>

The PSA sheet disclosed herein may be in an embodiment of a PSA product having a release liner adhered to a PSA layer surface to protect the adhesive face. Accordingly, the present description may provide a release linered PSA sheet (a PSA product) comprising a PSA sheet disclosed herein and a release liner protecting an adhesive face of the PSA sheet.

The release liner is not particularly limited. For example, it is possible to use a release liner having a release layer on the surface of a liner substrate such as a resin film or paper (possibly paper laminated with a resin such as polyethylene), a release liner that is formed from a resin film formed from a low-adhesive material such as a fluoropolymer (polytetrafluoroethylene, etc.) or a polyolefin resin (polyethylene, polypropylene, etc.). Because of the highly smooth surface, it is preferable to use a release liner having a release layer on the surface of a resin film as the liner substrate or a release liner that is formed from a resin film prepared from a low-adhesive material. The resin film is not particularly limited as far as the film can protect the PSA layer. Examples include polyethylene film, polypropylene film, polybutene film, polybutadiene film, polymethylpentene film, polyvinyl chloride film, vinyl chloride copolymer film, polyester film (PET film, PBT film, etc.), polyurethane film, and ethylene-vinyl acetate copolymer film. The release layer can be formed, using a known release agent such as a silicone-based release agent, a long-chain alkyl-based release agent, an olefin-based release agent, a fluorine-based release agent, a fatty acid amide-based release agent, molybdenum sulfide and silica powder. It is particularly preferable to use a silicone-based release agent. The thickness of the release layer is not particularly limited; it is generally suitably about 0.01 μm to 1 μm or preferably about 0.1 μm to 1 μm.

The thickness of the release liner is not particularly limited. It is usually suitably about 5 μm to 200 μm (e.g. about 10 μm to 100 μm, preferably about 20 μm to 80 pin). It is preferable that the release liner's thickness is in these ranges because it brings about excellent workability for application to and removal from the PSA layer. The release liner may be subjected to antistatic treatment as necessary, by means of coating, kneading, vapor deposition, etc.

<Applications>

According to the PSA sheet disclosed herein, both initial low adhesion and in-use strong adhesion can be favorably achieved. For instance, after applied to an adherend, the adhesive strength is kept low at around room temperature (e.g. 20° C. to 30° C.) for a while, providing good reworkability. With aging (possibly by intentional or non-intentional heating, a lapse of time, a combination of these, etc.), the PSA sheet can greatly gain in adhesive strength to achieve strong bonding from then on. With a low thermal resistance, the PSA sheet disclosed herein is suited for heat radiation of adherends through the PSA sheet.

With these features, the PSA sheet disclosed herein may be preferably used in an embodiment, for example, in which the PSA sheet is adhered to components of various portable devices for purposes such as fixing, connecting, heat radiating, heat transferring, shaping, decorating, protecting, and supporting the components. Here, being portable means not just providing simple mobility, but further providing a level of portability that allows an individual (average adult) to carry it relatively easily. Examples of the portable devices referred to herein include portable electronic devices such as mobile phones, smartphones, tablet PCs, notebook PCs, various wearable devices, digital cameras, digital video cameras, acoustic equipment (portable music players. IC recorders, etc.), computing devices (calculators, etc.), portable game devices, electronic dictionaries, electronic notebooks, electronic books, automotive information systems, portable radios, portable televisions, portable printers, portable scanners and portable modems as well as mechanical wristwatches and pocket watches, flashlights and hand mirrors. Examples of components of portable electronic devices may include optical films and display panels used in image display units such as liquid crystal displays and organic EL displays. The PSA sheet disclosed herein may be preferably used in an embodiment in which the PSA sheet is adhered to various components in automobiles and home electric appliances for purposes such as fixing, connecting, heat radiating, heat transferring, shaping, decorating protecting, and supporting the components.

Matters disclosed by this description include the following:

(1) A thermally conductive PSA sheet that comprises a PSA layer comprising a thermally conductive filler, the PSA sheet having a thermal resistance less than 6.0 cm$^2$·K/W, an adhesive strength N1 at 30 minutes of standing at 23° C. after applied to a stainless steel plate, and an adhesive strength N2 at 23° C. after subjected to 5 minutes of heating at 80° C. after applied to a stainless steel plate, wherein N2 is at least two times N1 (e.g. at least two times up to 100 times N1).

(2) A thermally conductive PSA sheet that comprises a PSA layer comprising a thermally conductive filler, the PSA sheet having a thermal resistance less than 6.0 cm$^2$·K/W, an adhesive strength N1 at 30 minutes of standing at 23° C. after applied to a stainless steel plate, and an adhesive strength N3 at 23° C. after subjected to 15 minutes of heating at 50° C. after applied to a stainless steel plate, wherein N3 is at least 1.3 limes N1, at least 1.5 times N1, or at least 1.7 times N1.

(3) The thermally conductive PSA sheet according to (1) or (2) above, wherein the thermally conductive filler content accounts for 80% by weight or less (e.g. greater than 0% and 80% or less by weight) of the PSA layer (4) The thermally conductive PSA sheet according to any of (1) to (3) above, wherein the PSA layer has a thickness Ta and the thermally conductive filler has a mean particle diameter of 0.5 Ta or smaller (e.g. greater than 0 Ta and 0.5 Ta or smaller).

(5) The thermally conductive PSA sheet according to any of (1) to (4) above, wherein the adhesive strength N2 is 15 N/20 mm or greater.

(6) The thermally conductive PSA sheet according to any of (1) to (5) above, wherein the adhesive strength N3 is 15 N/20 mm or greater.

(7) The thermally conductive PSA sheet according to any of (1) to (6), wherein the PSA layer has a thickness of 55 μm or larger.

(8) The thermally conductive PSA sheet according to any of (1) to (7) above, wherein the PSA layer is formed of a PSA comprising an adhesive strength rise retarder.

(9) The thermally conductive PSA sheet according to (8) above, wherein the adhesive strength rise retarder comprises at least one species selected form the group consisting of a siloxane structure-containing polymer Ps that comprises a monomer having a polyorganosiloxane skeleton as a monomeric unit; and a polyoxyalkylene structure-containing polymer Po that comprises a monomer having a polyoxyalkylene skeleton as a monomeric unit.

(10) The thermally conductive PSA sheet according to any of (1) to (9) above, wherein the PSA layer comprises a siloxane structure-containing polymer Ps comprising a polyorganosiloxane skeleton-containing monomer as a monomeric unit, and the siloxane structure-containing polymer Ps is a copolymer of the polyorganosiloxane skeleton-containing monomer and a (meth)acrylic monomer.

(11) The thermally conductive PSA sheet according to (10) above, wherein the polyorganosiloxane skeleton-containing monomer has a functional group equivalent weight of 700 g/ml or greater and less than 15000 g/mol.

(12) The thermally conductive PSA sheet according to (10) or (11) above, wherein the siloxane structure-containing polymer Ps has a Mw of $0.7 \times 10^4$ or higher and lower than $5 \times 10^4$.

(13) The thermally conductive PSA sheet according to any of (1) to (12) above, wherein the PSA layer comprises a siloxane structure-containing polymer Ps comprising a polyorganosiloxane skeleton-containing monomer and an acrylic polymer Pa having a Tg of 0° C. or lower, and the content of the siloxane structure-containing polymer Ps is 0.1 part by weight or greater and 50 parts by weight or less to 100 parts by weight of the acrylic polymer Pa.

(14) The thermally conductive PSA sheet according to any of (1) to (13) above, formed as a substrate-free double-faced PSA sheet having a first adhesive face formed of one surface of the PSA layer and a second adhesive face formed of the other surface of the PSA layer.

(15) The thermally conductive PSA sheet according to any of (1) to (14) above, wherein the PSA layer comprises an acrylic polymer Pa having a Tg of 0° C. or lower, and the acrylic polymer Pa are prepared from monomers including at least one species selected from the group consisting of a hydroxy group-containing monomer and an N-vinyl cyclic amide.

(16) The thermally conductive PSA sheet according to (15) above, wherein the hydroxy group-containing monomer and the N-vinyl cyclic amide have a combined amount accounting for 5% by weight or more and 50% by weight or less of the monomers for preparing the acrylic polymer Pa in total.

(17) The thermally conductive PSA sheet according to any of (1) to (16) above, wherein
the PSA layer comprises an acrylic polymer Pa having a Tg of 0° C. or lower, and
the acrylic polymer Pa are prepared from monomers including an alkoxy group-containing monomer.

(18) The thermally conductive PSA sheet according to (17) above, wherein the alkoxy group-containing monomer accounts for 0.5% by weight or more and 30% by weight or less (e.g. 1% by weight or more and 20% by weight or less) of the monomers.

(19) The thermally conductive PSA sheet according to any of (1) to (18) above, wherein the adhesive strength N2 is greater than the adhesive strength N1 by at least 10 N/20 mm.

(20) The thermally conductive PSA sheet according to any of (1) to (19) above, having a thickness of 55 μm or greater.

(21) The thermally conductive PSA sheet according to any of (1) to (20) above, having a thermal conductivity of 0.3 W/m·K or greater.

(22) A release-linered PSA sheet comprising the PSA sheet according to any of (1) to (21) above and a release liner protecting an adhesive face of the PSA sheet.

(23) The release-linered PSA sheet according to (22) above, wherein the release liner has a release face treated with at least one species of release agent selected from the group consisting of a silicone-based release agent, a long-chain alkyl-based release agent, an olefinic release agent and a fluorine-based release agent.

EXAMPLES

Several working examples related to the present invention are described below, but these specific examples are not to limit the present invention. In the description below, "parts" and "%" are by weight unless otherwise specified.

(Preparation of Acrylic Polymer A1)

The following were mixed: as monomers, 80 parts of 2-ethylhexyl acrylate (2EHA), 12 parts of 2-methoxyethyl acrylate (MEA) and 7 parts of N-vinyl-2-pyrrolidone (NVP) and 1 part of N-(2-hydroxyethyl)acrylamide (HEAA); and as photopolymerization initiators, 0.05 part of 2,2-dimethoxy-1,2-diphenylethane-1-one (trade name IRGACURE 651 available from BASF Corporation) and 0.05 part of 1-hydroxycyclohexyl phenyl ketone (trade name IRGACURE 184 available from BASF Corporation). The resulting mixture was irradiated by UV under a nitrogen atmosphere and polymerization was carried out to a viscosity of about 20 Pa·s (BH viscometer, No. 5 rotor, 10 rpm, measurement temperature 30° C.) to prepare an acrylic polymer A1 in a partial polymer form (acrylic polymer syrup) in which part of the monomers were polymerized.

(Preparation of Acrylic Polymer A2)

The following were mixed: as monomers, 40 parts of 2EHA, 40 parts of isostearyl acrylate (ISTA), 18 parts of NVP and 1 part of 4-hydroxybutyl acrylate (4HBA); and as photopolymerization initiators, 0.05 part of 2,2-dimethoxy-1,2-diphenylethane-1-one (trade name IRGACURE 651 available from BASF Corporation) and 0.05 part of 1-hydroxycyclohexyl phenyl ketone (trade name IRGACURE 184 available from BASF Corporation). The resulting mixture was irradiated by UV under a nitrogen atmosphere to prepare an acrylic polymer A2 in a partial polymer form (acrylic polymer syrup) in which part of the monomers were polymerized.

(Preparation of Siloxane Structure-Containing Polymer Ps1)

To a four-neck flask equipped with a stirring blade, thermometer, nitrogen gas inlet, condenser and addition funnel, were placed 100 parts of ethyl acetate, 40 parts of methyl methacrylate (MMA), 20 parts of n-butyl methacrylate (BMA), 20 parts of 2-ethylhexyl methacrylate (2EHMA), 9 parts of a polyorganosiloxane skeleton-containing methacrylate monomer having a functional group equivalent weight of 900 g/mol (product name X-22-174ASX available from Shin-Etsu Chemical Co., Ltd.), 11 parts of a polyorganosiloxane skeleton-containing methacrylate monomer having a functional group equivalent weight of 4600 g/mol (product name KF-2012 available from Shin-Etsu Chemical Co., Ltd.) and 0.6 part of thioglycerol as chain transfer agent. Under a nitrogen atmosphere, the resulting mixture was allowed to stir at 70° C. for one hour. Subsequently, was added 0.2 part of 2,2'-azobisisobutyronitrile (AIBN) as thermal polymerization initiator and the reaction was carried out at 70° C. for three hours. After this, was further added 0.1 part of AIBN and the reaction was carried out at 80° C. for five hours. A solution of siloxane structure-containing polymer Ps1 was thus obtained. The siloxane structure-containing polymer Ps1 had a weight average molecular weight (Mw) of 20000.

(Preparation of Siloxane Structure-Containing Polymers Ps2 and Ps3)

Thioglycerol was used in amounts of 0.8 part and 3 parts, respectively, but otherwise in the same manner as the preparation of siloxane structure-containing polymer Ps1, were prepared siloxane structure-containing polymers Ps2 and Ps3. Siloxane structure-containing polymers Ps2 and Ps3 had Mw values of 18000 and 6000, respectively.

The weight average molecular weight of each polymer was determined based on polystyrene by a GPC system (HLC-8220GPC available from Tosoh Corporation) under the conditions shown below:

Sample concentration: 0.2% by weight (tetrahydrofuran (THF) solution)
Sample injection: 10 μL
Eluent: THF, flow rate: 0.6 mL/minute
Measurement temperature: 40° C.
Columns:
Sample columns; 1 TSK guardcolumn SuperHZ-H+2 TSKgel SuperHZM-H columns
Reference column; 1 TSKgel SuperH-RC column
Detector: differential refractometer (RI)

<Fabrication of PSA Sheets>

Example 1

(Preparation of PSA Composition)

To 100 parts of the acrylic polymer A1 (acrylic polymer syrup) prepared above, were added 0.05 part of dipentaerythritol hexaacrylate (product name KAYARAD DPHA-40H available from Nippon Kayaku Co., Ltd.) as a polyfunctional monomer, 10 parts of siloxane structure-containing polymer Ps1, 250 parts of aluminum hydroxide powder as a thermally conductive filler and 1.5 part of product name PLYSURF A212E (available from DKS Co., Ltd.) as a dispersing agent. The resultant was mixed evenly to prepare a PSA composition C1. As the aluminum hydroxide powder, were used, at a 1:1 weight ratio. HIGILITE H-42 (mean particle diameter (by volume) 1 μm, maximum particle diameter (by volume)<10 μm, granular form) and HIGILITE H-10 (mean particle diameter (by volume) 55 μm, minimum particle diameter (by volume)≥10 μm, granular form) both available from Showa Denko K.K. In Examples 2 to 7 below, similarly, were used HIGILITE H-42 and HIGILITE H-10 at a 1:1 weight ratio as well.

Two different release liners R1 and R2 were obtained, each having a release face formed with a silicone-based release agent on one side of a polyester film. As the release liner R1, was used product name DIAFOIL MRF (38 μm thick) available from Mitsubishi Plastics. Inc. As the release liner R2, was used product name DIAFOIL MRE (38 μm thick) available from Mitsubishi Plastics, Inc.

The PSA composition C1 prepared above was applied to the release face of release liner R1 to form a coating layer. Subsequently, to the surface of the coating layer was covered with release liner R2 with the release face on the coating layer side to block oxygen from the coating layer. Using a chemical light lamp available from Toshiba Corporation, the laminate sheet (having a layered structure of release liner R I/coating layer/release liner R2) was irradiated by UV at an intensity of 5 mW/cm$^2$ for 360 seconds to cure the coating layer and form a 125 μm thick PSA layer. A substrate-free PSA sheet formed of the PSA layer was thus fabricated. The intensity value was determined by an industrial UV checker (available from Topcon Corporation, product name UVR-T1 with light detector model number UD-T36) with peak sensitivity at 350 nm in wavelength.

Example 2

To 100 parts of the acrylic polymer A2 (acrylic polymer syrup) prepared above, were added 0.2 part of trimethylolpropane triacrylate (product name TMP3A available from Osaka Organic Chemical Industry Ltd.) as a polyfunctional monomer, 5 parts of siloxane structure-containing polymer Ps2, 250 parts of aluminum hydroxide powder as a thermally conductive filler and 1.5 part of product name PLYSURF A212E (available from DKS Co., Ltd.) as a dispersing agent. The resultant was mixed evenly to prepare a PSA composition C2. Using the PSA composition C2 in place of the PSA composition C1, but otherwise in the same manner as Example 1, was fabricated a substrate-free PSA sheet according to this Example.

Examples 3 to 10

Using the acrylic polymer species and siloxane structure-containing polymer species in amounts as shown in Table 1, but otherwise in the same manner as Example 1, were fabricated substrate-free PSA sheets according to Examples 3 to 10. No siloxane structure-containing polymer was used in the PSA sheet of Example 6. No thermally conductive filler was used in the PSA sheet of Example 9. Neither siloxane structure-containing polymer nor thermally conductive filler was used in the PSA sheet of Example 10.

The following were determined with respect to the substrate-free PSA sheet (constituting a release-linered PSA sheet in which the first and second adhesive faces are protected with release liners R1 and R2) fabricated in each Example above.

<Determination of Adhesive Strength>
Using a SUS plate (SUS304BA plate) washed with toluene as the adherend, initial adhesive strength (adhesive strength N1) and post-heat adhesive strength (adhesive strength N2) were determined by the procedures shown below.

(Determination of Initial Adhesive Strength)
In a standard environment at 23° C. and 50% RH, the release liner R2 covering the second adhesive face of the PSA sheet according to each Example was removed. To the exposed second adhesive face, was applied a single-faced PSA tape (product No. 31B, substrate thickness 25 μm, total thickness 53 μm, width 20 mm; a single-faced PSA tape having an acrylic PSA layer on a polyester substrate) available from Nitto Denko Corporation. The resultant was cut along with the release liner R1 to a width of 20 mm to obtain a test piece. The release liner covering the first adhesive face of the test piece was removed. The exposed first adhesive face was press-bonded to the adherend with a 2 kg roller moved back and forth once. The test piece thus press-bonded to the adherend was left standing for 30 minutes in the standard environment. Subsequently, using a universal tensile/compression testing machine (machine name "tensile and compression testing machine, TCM-lkNB" available from Minebea Co., Ltd.), based on JIS Z 0237, at a peel angle of 180°, at a tensile speed of 300 mm/min, 180° peel strength (resistive force against the tension) was determined. The measurement was carried out three times. Their mean value is shown as initial adhesive strength (N1) in Table 1.

(Determination of Post-Heat Adhesive Strength)
A test piece press-bonded to the adherend in the same manner as the determination of initial adhesive strength was heated at 80° C. for five minutes and then left standing for 30 minutes in the standard environment. After this, 180° peel strength was measured in the same manner. The measurement was carried out three times. Their mean value is shown as the post-heat adhesive strength (N2) in Table 1.

(Determination of Adhesive Strength Rise Ratio)
With respect to each Example, the ratio of post-heat adhesive strength (N2) to initial adhesive strength (N1) was determined. The resulting value is shown in the column for the adhesive strength rise ratio (N2/N1) in Table 1.

<Determination of Thermal Resistance>
With respect to the PSA sheet according to each Example, thermal conductivity in the thickness direction was evaluated, using the thermal analysis instrument shown in FIG. 4(a). (b). Here, FIG. 4(a) shows a diagram outlining the front view of the thermal analysis instrument and FIG. 4(b) shows a diagram outlining the lateral view of the thermal analysis instrument. It is noted that the release liners R1 and R2 were removed for the measurement.

In particular, a PSA sheet S (20 mm×20 mm square) is placed between a pair of 20 mm side cube blocks (or rods) L made of aluminum (A5052, thermal conductivity: 140 W/m·K), thereby bonding the pair of blocks L to each other with the PSA sheet S. Then, the pair of rods L were vertically aligned between a heater block H and a heat radiator C (a cooling base plate with internally circulating cooling water). Specifically, the heater block H was arranged on the top block L and the heat radiator C was placed under the bottom block L.

Here, the pair of blocks L bonded to each other with the PSA sheet S were positioned between a pair of pressure-adjusting screws J put through the heater block H and heat radiator C. A load cell R was placed between each pressure-adjusting screw J and the heater block H so as to measure the pressure when tightening the pressure-adjusting screw J. The pressure measured was used as the pressure applied on the PSA sheet S. In particular, in this test, the pressure-adjusting screws J were tightened to a pressure of 25 N/cm² (250 kPa) applied on the PSA sheet S.

Three probes P (1 mm diameter) of a contact displacement meter were put through the bottom block L to the PSA sheet S from the heat radiator C side. Here, the top end of each probe P was placed in contact with the bottom face of the top block L to enable measurement of the distance between the top and bottom blocks L (the thickness of the PSA sheet S).

Temperature sensors D were installed in the heater block H and the top and bottom blocks L. In particular, a temperature sensor D was attached to one location in the heater block H. In addition, to five locations in each block L, temperature sensors D were attached at 5 mm intervals in the vertical direction.

For the measurement, the pressure-adjusting screws J were tightened to apply pressure to the PSA sheet S, while the temperature of the heater block H was set at 80° C., cooling water at 20° C. was allowed to circulate through the heat radiator C.

After the temperatures of the heater block H and the top and bottom blocks L stabilized, the temperatures of the top and bottom blocks L were measured with the respective temperature sensors D. From the thermal conductivities (W/m K) of the top and bottom blocks L and the temperature gradient between them, the heat flux passing though the PSA sheet S was determined, and the temperatures at the interfaces between the PSA sheet S and the top and bottom blocks L were determined. Using these values and the thermal conductivity formulas (Fourier's law) shown below, the thermal conductivity (W/m·K) and thermal resistance (cm²·K/W) at the particular pressure were determined. The resulting values are shown in Table 1.

$$Q = -\lambda \mathrm{grad} T$$

$$R = L/\lambda$$

wherein
Q: heat flow per unit area
gradT: temperature gradient
L: thickness of sheet
λ: thermal conductivity
R: thermal resistance 80° C. to 15 minutes at 50° C. This indicates that the mild heating effectively increases the adhesive strength as well.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

2, 3 PSA sheets
10 support substrate
10A first face
10B second face
21 PSA layer (first PSA layer)
21A adhesive face (first adhesive face)
21B second adhesive face
22 PSA layer (second PSA layer)
22A adhesive face (second adhesive face)
31, 32 release liners
100, 200, 300 release-lined PSA sheets (PSA products)

What is claimed is:

1. A thermally conductive pressure-sensitive adhesive sheet that comprises a pressure-sensitive adhesive layer comprising a thermally conductive filler,
   the pressure-sensitive adhesive sheet is formed as a substrate-free double-faced pressure-sensitive adhesive sheet having a first adhesive face formed of one surface of the pressure-sensitive adhesive layer and a second adhesive face formed of the other surface of the pressure-sensitive adhesive layer, and
   the pressure-sensitive adhesive sheet having
   a thermal resistance less than 6.0 cm²·K/W,
   an adhesive strength N1 at 30 minutes of standing at 23° C. after applied to a stainless steel plate, and
   an adhesive strength N2 at 23° C. after subjected to 5 minutes of heating at 80° C. after applied to a stainless steel plate, wherein N2 is at least two times N1.

2. The thermally conductive pressure-sensitive adhesive sheet according to claim 1, wherein the thermally conduc-

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Acrylic polymer | Species | A1 | A2 | A1 | A1 | A1 | A1 | A1 | A1 | A1 | A1 |
| | parts by wt. | 100 | 100 | 100 | 100 | 100 | 100 | 100 | 100 | 100 | 100 |
| Thermally conductive filler | parts by wt. | 250 | 250 | 250 | 250 | 250 | 250 | 250 | 250 | — | — |
| Siloxane structure-containing polymer | Species | Ps1 | Ps1 | Ps2 | Ps2 | Ps2 | — | Ps3 | Ps3 | Ps2 | — |
| | parts by wt. | 10 | 5 | 5 | 2 | 20 | — | 5 | 2 | 5 | — |
| Initial adhesive strength (N1) (N/20 mm) | | 3.5 | 14.0 | 7.1 | 12.1 | 1.6 | 12.1 | 11.3 | 12.3 | 3.2 | 7.3 |
| Post-heat adhesive strength (N2) (N/20 mm) | | 28.3 | 30.1 | 27.6 | 28.1 | 25.0 | 14.2 | 12.3 | 14.1 | 12.8 | 10.0 |
| Adhesive strength rise ratio (N2/N1) | | 8.1 | 2.2 | 3.9 | 2.3 | 15.6 | 1.2 | 1.1 | 1.1 | 4.0 | 1.4 |
| Thermal resistance (cm² · K/W) | | 1.6 | 2.2 | 1.5 | 1.4 | 1.6 | 1.4 | 1.5 | 1.4 | 8.9 | 8.6 |
| Thermal conductivity (W/m · K) | | 0.6 | 0.6 | 0.7 | 0.7 | 0.6 | 0.7 | 0.7 | 0.7 | 0.1 | 0.1 |

As shown in Table 1, with respect to the PSA sheets of Examples 1 to 5 having an adhesive strength rise ratio of 2 or higher and containing a thermally conductive filler, the post-heat adhesive strength was clearly higher than the PSA sheets of Examples 6 to 10. With respect to the PSA sheet of Example 1, post-mild-heat adhesive strength (N3) was determined to be 27.1 N20 mm when measured in the same manner as the measurement of post-heat adhesive strength (N2), but changing the heating conditions from 5 minutes at tive filler content accounts for 80% by weight or less of the pressure-sensitive adhesive layer.

3. The thermally conductive pressure-sensitive adhesive sheet according to claim 1, wherein the pressure-sensitive adhesive layer has a thickness Ta and the thermally conductive filler has a mean particle diameter of 0.5Ta or smaller.

4. The thermally conductive pressure-sensitive adhesive sheet according to claim 1, wherein the adhesive strength N2 is 15 N/20 mm or greater.

5. The thermally conductive pressure-sensitive adhesive sheet according to claim 1, wherein the pressure-sensitive adhesive layer has a thickness of 55 μm or larger.

6. The thermally conductive pressure-sensitive adhesive sheet according to claim 1, wherein the pressure-sensitive adhesive layer is formed of a pressure-sensitive adhesive comprising an adhesive strength rise retarder.

7. The thermally conductive pressure-sensitive adhesive sheet according to claim 1, wherein
the pressure-sensitive adhesive layer comprises a siloxane structure-containing polymer Ps comprising a polyorganosiloxane skeleton-containing monomer as a monomeric unit, where the siloxane structure-containing polymer Ps is a copolymer of the polyorganosiloxane skeleton-containing monomer and a (meth)acrylic monomer.

8. The thermally conductive pressure-sensitive adhesive sheet according to claim 7, wherein the siloxane structure-containing polymer Ps has a weight average molecular weight of $0.7 \times 10^4$ or higher and lower than $5 \times 10^4$.

9. The thermally conductive pressure-sensitive adhesive sheet according to claim 1, wherein
the pressure-sensitive adhesive layer comprises a siloxane structure-containing polymer Ps comprising a polyorganosiloxane skeleton-containing monomer and further comprises an acrylic polymer Pa having a glass-transition temperature of 0° C. or lower, wherein
the content of the siloxane structure-containing polymer Ps is 0.1 part by weight or greater and 50 parts by weight or less to 100 parts by weight of the acrylic polymer Pa.

10. A thermally conductive pressure-sensitive adhesive sheet that comprises a pressure-sensitive adhesive layer comprising a thermally conductive filler,
the pressure-sensitive adhesive sheet is formed as a substrate-free double-faced pressure-sensitive adhesive sheet having a first adhesive face formed of one surface of the pressure-sensitive adhesive layer and a second adhesive face formed of the other surface of the pressure-sensitive adhesive layer, and
the pressure-sensitive adhesive sheet having
a thermal resistance less than 6.0 cm$^2$·K/W,
an adhesive strength N1 at 30 minutes of standing at 23° C. after applied to a stainless steel plate, and
an adhesive strength N3 at 23° C. after subjected to 15 minutes of heating at 50° C. after applied to a stainless steel plate, wherein N3 is at least 1.5 times N1.

11. The thermally conductive pressure-sensitive adhesive sheet according to claim 10, wherein the thermally conductive filler content accounts for 80% by weight or less of the pressure-sensitive adhesive layer.

12. The thermally conductive pressure-sensitive adhesive sheet according to claim 10, wherein the pressure-sensitive adhesive layer has a thickness Ta and the thermally conductive filler has a mean particle diameter of 0.5Ta or smaller.

13. The thermally conductive pressure-sensitive adhesive sheet according to claim 10, wherein the adhesive strength N2 is 15 N/20 mm or greater.

14. The thermally conductive pressure-sensitive adhesive sheet according to claim 10, wherein the pressure-sensitive adhesive layer has a thickness of 55 μm or larger.

15. The thermally conductive pressure-sensitive adhesive sheet according to claim 10, wherein the pressure-sensitive adhesive layer is formed of a pressure-sensitive adhesive comprising an adhesive strength rise retarder.

16. The thermally conductive pressure-sensitive adhesive sheet according to claim 10, wherein
the pressure-sensitive adhesive layer comprises a siloxane structure-containing polymer Ps comprising a polyorganosiloxane skeleton-containing monomer as a monomeric unit, where the siloxane structure-containing polymer Ps is a copolymer of the polyorganosiloxane skeleton-containing monomer and a (meth)acrylic monomer.

17. The thermally conductive pressure-sensitive adhesive sheet according to claim 16, wherein the siloxane structure-containing polymer Ps has a weight average molecular weight of $0.7 \times 10^4$ or higher and lower than $5 \times 10^4$.

18. The thermally conductive pressure-sensitive adhesive sheet according to claim 10, wherein
the pressure-sensitive adhesive layer comprises a siloxane structure-containing polymer Ps comprising a polyorganosiloxane skeleton-containing monomer and further comprises an acrylic polymer Pa having a glass-transition temperature of 0° C. or lower, wherein
the content of the siloxane structure-containing polymer Ps is 0.1 part by weight or greater and 50 parts by weight or less to 100 parts by weight of the acrylic polymer Pa.

* * * * *